(12) United States Patent
Pauly et al.

(10) Patent No.: US 7,277,940 B2
(45) Date of Patent: Oct. 2, 2007

(54) MANAGING UNEVEN AUTHORIZATIONS IN A COMPUTER DATA EXCHANGE

(75) Inventors: Heinz Pauly, Ludwigshafen (DE); Prasad Kompalli, Bangalore (IN)

(73) Assignee: SAP AG, Walldorf (DE)

( * ) Notice: Subject to any disclaimer, the term of this patent is extended or adjusted under 35 U.S.C. 154(b) by 905 days.

(21) Appl. No.: 10/335,265

(22) Filed: Jan. 2, 2003

(65) Prior Publication Data

US 2004/0044766 A1 Mar. 4, 2004

Related U.S. Application Data

(60) Provisional application No. 60/406,631, filed on Aug. 29, 2002.

(51) Int. Cl.
*G06F 15/173* (2006.01)

(52) U.S. Cl. .................. 709/225; 709/223; 709/226

(58) Field of Classification Search ........... 709/204, 709/205, 225; 707/104.1
See application file for complete search history.

(56) References Cited

U.S. PATENT DOCUMENTS

| | | | |
|---|---|---|---|
| 4,714,995 A | | 12/1987 | Materna et al. |
| 5,634,127 A | | 5/1997 | Cloud |
| 5,701,423 A | | 12/1997 | Crozier |
| 5,721,912 A | | 2/1998 | Stepczyk et al. |
| 5,778,373 A | | 7/1998 | Levy et al. |
| 5,870,605 A | | 2/1999 | Bracho et al. |
| 5,870,765 A | | 2/1999 | Bauer et al. |
| 5,873,096 A | | 2/1999 | Lim et al. |
| 5,948,057 A | * | 9/1999 | Berger et al. ............ 709/205 |
| 6,052,684 A | | 4/2000 | Du |
| 6,161,149 A | * | 12/2000 | Achacoso et al. ........... 710/4 |
| 6,226,649 B1 | | 5/2001 | Bodamer et al. |
| 6,256,676 B1 | | 7/2001 | Taylor et al. |
| 6,324,492 B1 | | 11/2001 | Rowe |
| 6,339,795 B1 | | 1/2002 | Narurkar et al. |
| 6,381,601 B1 | | 4/2002 | Fujiwara et al. |
| 6,446,092 B1 | | 9/2002 | Sutter |
| 6,748,402 B1 | | 6/2004 | Reeves et al. |
| 6,845,378 B1 | * | 1/2005 | Pauly et al. ............ 707/101 |
| 6,925,477 B1 | * | 8/2005 | Champagne et al. ....... 707/203 |

(Continued)

FOREIGN PATENT DOCUMENTS

EP 0 592 045 4/1994

(Continued)

OTHER PUBLICATIONS

Durbaon, S.D., et al., Interconnection of Distributed Components: An Overview of Current Middleware Solutions, Journal of Computing and Information Science in Engineering, vol. 1, Mar. 2001, pp. 23-31.

(Continued)

*Primary Examiner*—Khanh Dinh
*Assistant Examiner*—Alan Chou
(74) *Attorney, Agent, or Firm*—Fish & Richardson P.C.

(57) ABSTRACT

Techniques are provided to integrate applications having different data structures. Data from the application having a less restrictive data structure is provided to the application with a more restrictive data structure as the application is capable of storing the data. Data from the application having a less restrictive data structure may be stored.

25 Claims, 11 Drawing Sheets

U.S. PATENT DOCUMENTS

| | | |
|---|---|---|
| 6,954,932 B2 | 10/2005 | Nakamura |
| 2002/0038336 A1 | 3/2002 | Abileah |
| 2002/0059361 A1* | 5/2002 | Saruwatari .................. 709/203 |
| 2002/0073236 A1 | 6/2002 | Helgeson |
| 2002/0095653 A1 | 7/2002 | Parr |
| 2002/0107752 A1 | 8/2002 | Rivera |
| 2002/0152210 A1* | 10/2002 | Johnson et al. ................ 707/9 |
| 2003/0120828 A1 | 6/2003 | Clark |
| 2003/0126293 A1 | 7/2003 | Bushey |
| 2003/0169695 A1* | 9/2003 | Salo et al. .................. 370/264 |
| 2004/0236714 A1* | 11/2004 | Eisenberger et al. ........... 707/1 |
| 2006/0090013 A1* | 4/2006 | Achacoso et al. ............. 710/4 |

FOREIGN PATENT DOCUMENTS

| | | |
|---|---|---|
| EP | 1217515 | 6/2002 |
| WO | WO93/04436 | 3/1993 |
| WO | WO 00/79408 | 12/2000 |
| WO | WO 01/27806 | 4/2001 |
| WO | 02/091240 | 11/2002 |

OTHER PUBLICATIONS

Gray et al., The Dangers of Replication and a Solution, ACM SIGMOD Record, Jun. 1996, pp. 173-182.

Huston et al., Disconnected Operations for AFS, Proceedings of the USENIX Mobile and Location-Independent Computing Symposium, Cambridge, MA, Aug. 2-3 1993, USENIX Association, pp. 1-10.

* cited by examiner

MANAGING UNEVEN AUTHORIZATIONS IN A COMPUTER DATA EXCHANGE

CROSS REFERENCE TO RELATED APPLICATION

This application claims priority from U.S. Provisional Application No. 60/406,631, titled "Isolated Mapping Point" and filed Aug. 29, 2002, which is incorporated by reference in its entirety.

TECHNICAL FIELD

This description relates to techniques for exchanging data between two or more computer systems.

BACKGROUND

A database, such as a relational database, an object-oriented database, or another type of data management system, may be used for the administration of data processed by a computer system running one or more application programs or systems. Examples of application programs or systems include an enterprise resource management system, a customer relationship management system, a human resources management system, a supply chain management system, and a financial management system. Data from one data management system used for one application system may need to be sent to one or more data management systems for storage and use by other application systems. The transfer of data from one data management system to another data management system may be referred to as a data exchange. When two data management systems or application systems need to exchange data on a routine basis, the development of a data exchange capability may be referred to as the integration of the application systems. Often, the format, structure or type of data stored in one application system is not usable by another application without first transforming the data in some way. Generally, a data transformation process accesses and uses data and transformation rules stored in one of the application systems involved in the data exchange.

SUMMARY

Techniques are provided to integrate application systems by using an isolated mapping point that is a computer system, a server, or other computing device that includes a mapping data store and performs mapping functions. An isolated mapping point receives data from a sending system, transforms the data as necessary, and sends the transformed data to a receiving system. The isolated mapping point performs the data transformation using only data included in the mapping data store. The mapping data store for the isolated mapping point receives data through a well-defined interface. An example of such a well-defined interface includes when is data sent in, or along with, a mapping request from the sending system.

By including a mapping data store, the isolated mapping point avoids the need to access any application-specific data for performing the data translations (and hence the name isolated mapping point). The isolated mapping point also may be referred to as isolated because the isolated mapping point replaces the use of invisible, undocumented interfaces for data translations and isolates the data translation (or mapping) from one system to another system in the single access point.

Through the use of an isolated mapping point, the integration of application systems may be decoupled (or separated) from the technical methods of communication and the application systems being integrated. This may improve the ability to substitute one application system with another application system in a heterogeneous landscape of application systems that need to be integrated. For example, an application system that has been previously integrated with another application system may have to be replaced. When the application integration software does not use the application system to be replaced to provide the transformation rules or data for any data transformation needed in the integration, the application system may be more quickly and easily replaced because the application system may be replaced without developing transformation rules or new data access programs that previously had been performed by the application system to be replaced.

In one general aspect, the integration of application systems involves two data processing systems. The first data processing system has a less restrictive data structure than the second data processing system. Computer data is exchanged between the two data processing systems. Data from the first data processing system is received and stored. A determination as to whether a data structure associated with the second data processing system is capable of storing the data received from the first data processing system. The data received from the first data processing system is only sent to the second data processing system when the data structure associated with the second data processing system is capable of storing the data.

The data received may be data to be inserted in the second data processing system, or may be data to update data stored in the second data processing system. The first data processing system may be a groupware data system, and the data received may be groupware data. The groupware data received may be contact information or may be calendar information.

When the data received from the first data processing system is not sent to the second data processing system, an indication that the data received from the first data processing system has not been sent to the second data processing system may be associated with an identifier associated with the data received. Subsequently, when the second data processing system is capable of storing the data received from the first data processing system, the data received from the first data processing system may be sent to the second data processing.

A determination may be made as to whether the data structure associated with the second data processing system is capable of storing a portion of the data received from the first data processing system. The portion of the data received from the first data processing system to the second data processing system may only sent when the data structure associated with the second data processing system is capable of storing the portion of data. When the portion of the data received from the first data processing system is not sent to the second data processing system, an indication that the portion of the data received from the first data processing system has not been sent to the second data processing may be associated. Subsequently, when the second data processing system is capable of storing the portion of the data received from the first data processing system, the portion of the data received from the first data processing system may be sent to the second data processing system.

A data exchange facility may receive the data, store the data, and determine whether the data structure associated with the second data processing system is capable of storing the received data. The data exchange facility may have a mapping data store and a mapping function.

An indication of data to be deleted may be received from the first data processing system. A determination is made as to whether the data structure associated with the second data processing system permits the indicated data to be deleted. The indication of data to be deleted received from the first data processing system is only sent to the second data processing system when the data structure associated with the second data processing system permits deleting the indicated data.

When the data structure associated with the second data processing system does not permit deleting the indicated data, the data to be inserted to replace the indicated data may be sent to the first data processing system. The data sent may be data that is accessed or may be data that is sent from the second processing system in response to a request.

The indication of data to be deleted received may be an indication of groupware data to be deleted. The indication of groupware data to be deleted may be an indication of contact information to be deleted or an indication of calendar information to be deleted.

Implementations of the techniques discussed above may include a method or process, an apparatus or system, or computer software on a computer-accessible medium. The details of one or more of the implementations are set forth in the accompanying drawings and description below. Other features will be apparent from the description and drawings, and from the claims.

DESCRIPTION OF THE DRAWINGS

Like reference symbols in the various drawings indicate like elements.

DETAILED DESCRIPTION

Figure 1:
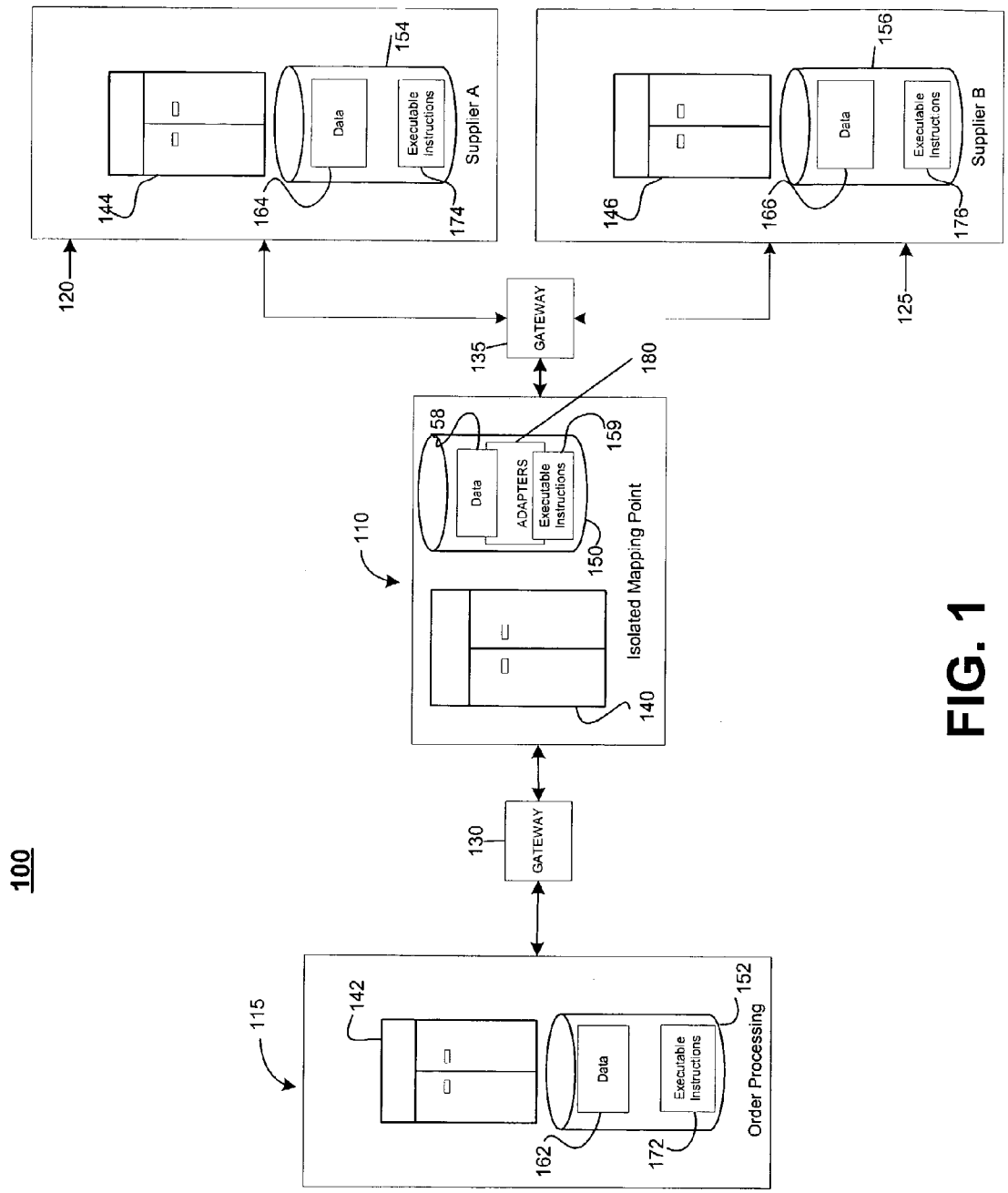
FIG. 1 is a diagram of a network having an isolated mapping point to control the exchange of data between three different computer systems.

To fully understand the techniques presented in this description the challenges and issues of application integration need to be fully understood. Application integration refers to the connection of two or more systems through data exchange. Application integration may occur, for example, when a new system is installed, a new version of system installed, or a system with which the application communicates is changed. Application integration may represent a significant portion of the cost of owning and operating an application system (which may be referred to as the total cost of ownership). The reduction of the time needed to design and implement application integration software needed to translate data from one system and/or data format to another system and/or data format may improve application integration by reducing data exchange errors, decreasing the time needed to develop application integration software, and may help reduce the total cost of ownership of an application system.

Data management systems, such as a relational database, an object-oriented database, or another type of data management system, are widely used for administration of data which are processing by application programs or systems running on computer systems. In a relational database, the data form a large number of two-dimensional tables, which describe a relationship. A table may, for example, relate to an object and to data which can be uniquely associated with the object. For example, the customer data of a company may be stored in a "customer" table whose columns relate to different customer attributes (for example, company name, billing address, contact information). The values for different customers form the rows in the table. The tables contained in relational databases relate not only to objects but also to relationships between objects. For example, when an order for a specific customer is processed, the "order" table that is generated for the administration of orders contains a "for customer" attribute that is used to define the customer-order relationship (for example, identifies the customer to which the order applies). Such attributes (which may be implemented by the use of pointers from one object to another in the database) play a major role for representing relationships between objects that are described by different tables in a database.

Data stored by different data management systems may use different data models that require data to be transformed (or converted or translated) to a different data structure before the data can be accepted or used by the other system. To accomplish data exchange between two heterogeneous data management systems, data structures in a data management system may be mapped onto one another. In addition, the data contents need to be matched appropriately (for example, the object "customer" in one system corresponds to "buyer" in another system). For example, one data management system may store data values representing a particular attribute using a different field type and length as that used by a different data management system. A data management system may use different data codes than another data management system. For example, one system may store a country value using a numeric code (for example, a "1" for the United States and a "2" for the United Kingdom) whereas another system may store a country value as a textual abbreviation (for example, "U.S." for the United States and "U.K." for the United Kingdom). The country codes in the two systems may be identified as representing the same attribute and then a translation table made available that translates the various possible values from one system to another system (for example, "1" to "U.S." and "2" to "U.K.").

Data stored by different data management systems also may use different primary key structures to uniquely identify a particular data object. For example, one system may use a proprietary key numbering system in which primary keys are created by sequentially allocating numbers within an allocated number range. Another system may use a GUID ("globally unique identifier") key that is produced from a well-known algorithm and is able to be processed by any computer system using the well-known algorithm. In order to accurately exchange data, the key values may need to be mapped from one system to another system.

Data stored by different data management systems also may use different data management system types. For example, data may be stored by a relational database in one system and stored as an XML ("Extensible Mark-up Language") document in another system. XML is a language similar to hypertext markup language (HTML) but with the additional flexibility of being able to describe data structures that can be processed directly as data by a program. The data formats used to exchange data need to use a format that is able to be used by the receiving data management system.

These data mapping complexities complicate the data exchange between systems that need to be integrated. Often data mapping transformations are accomplished using application-specific code that may be hidden from the data transformation interface. When the application-specific code is modified, the data exchange program that uses the application-specific code may malfunction.

Data exchange also may be complicated by the number of different systems with which a particular system needs to be integrated. Often data may need to be exchanged with a network of interconnected computer systems, some of which may be owned and operated by the same corporate entity and some of which may be owned and operated by different corporate entities. For example, a customer relationship management system used for entering customer orders may need to be integrated with an order processing system used to process each entered order, a financial management system used for financial reporting, and multiple suppliers with whom one or more orders are placed. Each supplier typically is a different corporate entity than the company that places the order.

In addition, data exchange software may need to be modified when any one of the systems is modified or replaced. For example, a supplier or other business partner may be changed and data exchange software may have to be developed for the new supplier or other business partner. Often data exchange software may need to be developed under strict time constraints, such as when a supplier is replaced with a new supplier. The time and costs associated with developing and maintaining data exchange software may be a significant portion of the total cost of ownership of a particular application program or system.

Data exchange also may be complicated when data enhancement (or enrichment) needs to occur when data is exchanged with another system. For example, application systems that operate on portable computing devices (such as a personal digital assistant or laptop computer) may have fewer data fields than corresponding data fields on another system that receives data from the application system on the portable computing device. Data may not be accepted by the other system without adding data fields that are required by the receiving application system. For example, the application system on the portable computing device may not include data fields that are mandatory on the receiving application system. For data to be accepted by the receiving application system, the mandatory data must be entered, for example, by adding default data values that are added or adding data values applicable to the particular record.

Data exchange also may be complicated when two application systems use inconsistent authorization rules. Generally, a data management system uses authorization rules to determine the database operations (such as insert, update, or delete) that are permitted to be performed on various data types stored in the data management system. The use of inconsistent authorization rules in application systems may be referred to as uneven authorization. An example of uneven authorization occurs when an application system does not permit the deletion of a particular object type whereas another application system allows the deletion of the same object type. The difference in the delete authorization rule (or the uneven authorization) may lead to inconsistent data when one application system deletes the object data and the corresponding object data remains in the other application system that does not permit the object type to be deleted.

Data exchange also may be complicated when an application system receives a data exchange message to modify data that is not included in the receiving application system. For example, an application system may receive a message to update a record (or other type of data collection) before the application system has received a data exchange message to insert data to create the record that is to be updated. In such a case, the receiving application system may fail to process the update message (for the data that is to be updated is not available in the receiving application system). Further, when the application system receives the insert message, the application system then inserts the very data that was to be updated by the update message. This results in inconsistent data in the two application systems that are included in the data exchange when the sending system includes the updated data and the receiving system includes the obsolete data that was to be updated.

Similarly, an application system may receive a message to delete a record before the application system has received a data exchange message to insert data to create the record that is to be deleted. In such a case, the receiving application system may fail to process the delete message (for the data that is to be deleted is not available in the receiving application system). Further, when the application system receives the insert message, the application system then inserts the very data that was to be deleted by the delete message. This results in inconsistent data in the two application systems that are included in the data exchange when the sending system does not include the data and the receiving system includes the obsolete data that was to be deleted.

An application system may use a last-one-wins strategy to resolve a data conflict between the application systems. The last-one-wins strategy describes an approach that stores a message received based on the order in which the message was received. An application system employing a last-one-wins strategy stores the last message received, even when the last message is inconsistent with a previously received message. For example, an insert-record message may be received and the data associated with the insert-record message stored. The receiving application system stores the data associated with the insert-record message even when the insert-record message is inconsistent with the previously-received delete message that deleted the same data as inserted by the insert-record message. The insert-record message is performed because the insert-record message was received after the delete message was received, and, thus the last modification (here, the insert operation) "wins" over the previous modification (here, the delete operation) such that the last modification persists in the data management system. The last-one-wins strategy is so named because a later-received data exchange message (the "last-one") may reverse the data modification previously performed in response to a previously-received data exchange message.

Generally, an application system determines whether received data satisfies data validation rules of the application system. Data validation rules include business logic or other types of decision logic implemented by the application system to determine whether data is valid or otherwise acceptable for use. Some application systems may reject the received data when the received data does not satisfy the data validation rules. For example, an application system may not store the received data so that the received data is available to the users of the application system. An application system that rejects data that does not satisfy data validation rules may be referred to as a restrictive application system.

In contrast, other application systems may accept data that does not satisfy the validation rules of the application system. An application also may associate with the received data an indicator that identifies, for example, whether the received data satisfies the validation rules. In some implementations, more detailed information about the data validation failure may be associated with the indication of whether the received data satisfies the validation rules. For example, an indication of whether the received data is incomplete, includes errors, or both may be associated with the received data. Yet other application systems may accept the received data without determining whether the received data satisfies the validation rules in the receiving application system. When an application system accepts data that does not satisfy the data validation rules or an application system accepts data that may not satisfy the validation rules (as in the case in which the application system does not determine whether the data satisfies the validation rules), the application system may be referred to as a tolerant application system.

The data transformation process used to integrate application systems may depend on whether the receiving system is a restrictive application system or is a tolerant application system. For example, the data transformation process may be less rigorous when the receiving system is tolerant because the received data is not rejected. This may be particularly useful when resolving an out-of-order message conflicts (as when a update message is received before an insert message).

FIG. 1 shows a network having a computer system 110 that functions as an isolated mapping point to control data exchange between three different computer systems 115, 120, and 125. The isolated mapping point 110 is capable of delivering and exchanging data with computer systems 115 through communication gateway 130, and with computer systems 120 and 125 through communication gateway 135. As is conventional, each computer system 110, 115, 120 or 125 includes a server 140, 142, 144, or 146 and a data storage device 150, 152, 154, or 156 associated with each server. Data storage device 150 includes data 158 and executable instructions 159 for the isolated mapping point function on computer system 10. Each of the data storage devices 152, 154, and 156 includes data 162, 164, or 166 and executable instructions 172, 174, or 176 for an application program on computer system 115, 120, or 125. The isolated mapping point 110 may be arranged to operate within or in concert with one or more other systems, such as, for example, one or more LANs ("Local Area Networks") and/or one or more WANs ("Wide Area Networks").

The communication gateway 130 receives and routes messages between the computer systems 110 and 115, and the communication gateway 135 receives and routes messages between the computer systems 115, 120 and 125. Each communication gateway 130 or 135 reads the headers of received messages and uses forwarding tables to determine the computer system to which the received messages are to be sent. The communication gateway also includes a switch that determines the path that the message will follow to the computer system to which the message is being sent. Each communication gateway 130 and 135 also serves as a firewall to prevent unauthorized access to computer system.

A communication gateway 130 or 135 may connect to computer systems 110, 115, 120, or 125 through the Internet, the World Wide Web (web), WANs, LANs, analog or digital wired and wireless telephone networks, satellite, and/or any other delivery mechanism for carrying data. A communication gateway 130 or 135 may connect through, for example, a wired, wireless, cable, or satellite communication pathway.

In an example of integrating data from a customer relationship management system with two different supplier computer systems 120 and 125, the computer system 115 sends order data to the isolated mapping point on computer system 110 through communication gateway 130. The computer system 110 uses middleware to direct data exchange messages with the computer system 115, 120 or 125 and uses different types of message structures to communicate different data structures. The computer system 110 uses an appropriate middleware adapter in adapters 180 to transform the received data modifications into supplier application-specific data which are sent to computer system 120 of Supplier A. Similarly, computer system 110 uses a middleware adapter in adapters 180 to transform the received order data to data specific to the supplier application program operating on computer system 125 of Supplier B. As discussed below, the middleware adapter in adapters 180 includes data and executable instructions. A middleware adapter in adapters 180 uses data 158 stored in data storage device 150. Collectively, stored data 158 may be referred to as a mapping data store or as a mapstore. The mapstore 158 provides any data needed by a middleware adapter to transform the order data from the format used by order processing application system operating on computer system 115 to the order data format used by supplier application programs operating on computer systems 120 or 125.

The computer system 10 distributes the messages using communication gateway 135 to the supplier application system A operating on computer system 120 and the supplier application system operating B on computer system 125. The orders then are available for processing by the supplier systems A and B.

In some implementations, a common document object may be used as an intermediate, common data format in a data exchange. The isolated mapping point 110 may translate the protocol used by, and/or the data included in, a message received from a sending system directly to an intermediate, common data format. The isolated mapping point 110 may subsequently transform the data in the common data format into a data format usable by a receiving system. In other cases, the receiving application system subsequently transforms the common document object into a format directly usable by that application system.

The message with data in the common format may be referred to as a common document object. The common document object may be based on a data model that is jointly used by application systems to allow the transport of common data in a standardized way. In some cases the data model that is jointly used may be at a higher level than the data models used by the application systems for data processing within the application system. A model that is at a higher level than another model may be referred to as a meta model.

The use of a common document object may reduce the amount of time and cost for integrating application systems and also may reduce the number of errors that occur in data exchange. Some or all of these advantages may be accomplished, for example, because the number of data exchange interfaces that have to be written for any one application may be reduced through the use of a common document object. With the use of a common document object to integrate four application systems, for example, the number of data exchange interfaces to be developed is reduced. Without using a common document object, as many as twelve data exchange interfaces may be needed to send and receive data between any two of the four application systems.

Errors may be reduced by virtue of the division into two processes of the transformation process from the data model, structure or format used in one application system to that used by the other application system. Specifically, a first process translates the data model, structure or format used in one application system to the common document object data model, structure or format. Then, a second process translates the data model, structure or format used in the common document object to the data model, structure or format used by the other application system. The separation of the transformation process into two processes may help simplify each of the two data exchange interfaces. The simplification of data exchange interface may help reduce the number and complexity of errors in the data exchange interface.

The isolated mapping point 110 may be developed using conventional procedural integration programming or other conventional software engineering techniques. For example, application integration software may be developed without the use of CASE tools or other code generation tools. Alternatively, the isolated mapping point 150 may be developed using a declarative approach that describes the data transformation to be performed without specifying the precise procedural steps necessary. When an isolated mapping point uses a declarative approach, the efficiency of the isolated mapping point may be improved.

Figure 2:
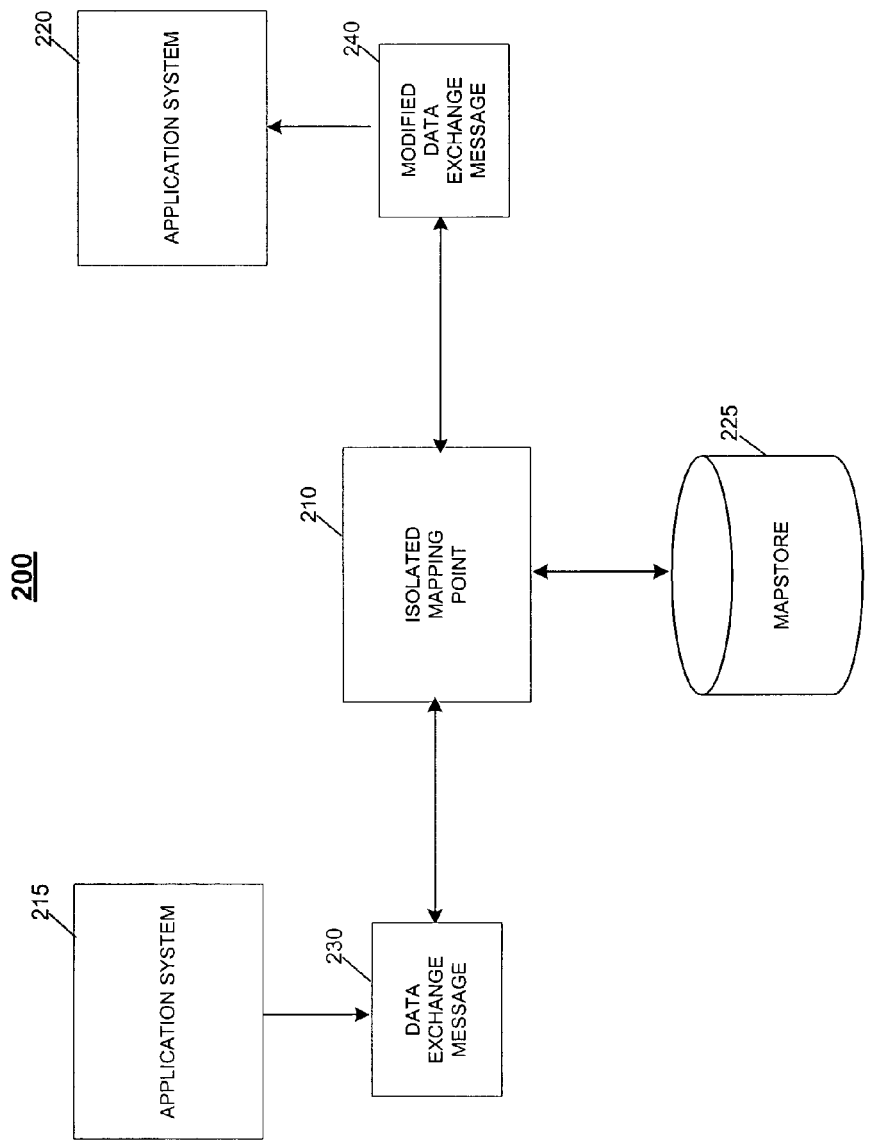
FIG. 2 is a diagram of a system that includes an isolated mapping point including a map store to perform a data exchange between two application systems.

FIG. 2 shows a diagram of a system 200 that includes an isolated mapping point 210, such as isolated mapping point 110 in FIG. 1, for performing a data exchange between two different application systems 215 and 220. The application system 215 uses a data structure (or schema) that is different from the data structure used by the application system 220. The isolated mapping point 210 includes a mapstore 225, such as data 158 in FIG. 1.

The isolated mapping point 210 receives the data exchange message 230 from the application system 215. The data exchange message 230 includes data in a format used by the application system 215. The isolated mapping point 210 accesses data in the mapstore 225 and performs data transformations to translate the data associated with the data exchange message 230 to a protocol and format used by a second data exchange message 240 that is usable by application system 220. The second data exchange message 240 includes data in a format based on a data schema associated with application system 220. For example, the isolated mapping point 210 may use the mapstore 225 to perform data mapping from the data schema used by the data exchange message 230 to the data schema used by the message 240. This may be accomplished, for example, when the mapstore 225 includes a data translation table that translates a data code used in one of the schemas to a corresponding data code used in the other schema. The mapstore 225 also may include other types of transformation data to perform more complex types of data mapping, such as structure mapping, key mapping, and more complex value mapping, all of which are described later. The isolated mapping point 210 sends the second data exchange message 240 to application system 220. The application system 220 receives the data exchange message 240 and stores the data such that the data is usable in the functions performed by the application system 220.

The isolated mapping point 210 is functionally complete such that the isolated mapping point 210 is able to perform the data transformations without having to access data on application system 215 or on application system 220. In other words, all of the data needed to perform the needed data transformations are included in the mapstore 225 and accessible to the isolated mapping point 210. The isolated mapping point 210 accesses the mapstore 225 to obtain any data required during the transformation process. For example, the isolated mapping point 210 may access the mapstore 225 for default data or other types of data to add to the modified data exchange message 240 that is missing from the data exchange message 230. In other words, the isolated mapping point 210 may enhance the data associated with the data exchange message 230 with data from the mapstore 225 so that the data exchange message 240 includes sufficient data for the modified data exchange message 240 to be stored by the application system 220. As such, the isolate mapping point 210 is performing a function that may be referred to as data enrichment. One example of this is where the isolated mapping point 210 uses default data stored in the mapstore 225 to provide required data in the modified data exchange message 240. This process used by the isolated mapping point 210 to perform data enrichment may be referred to as a defaulting process. In some cases, the defaulting process may involve performing complex decision logic to determine the data value or data values to be inserted. The complex decision logic may, for example, involve the determination of default data values based on multiple fields values in the received data.

Figure 3:
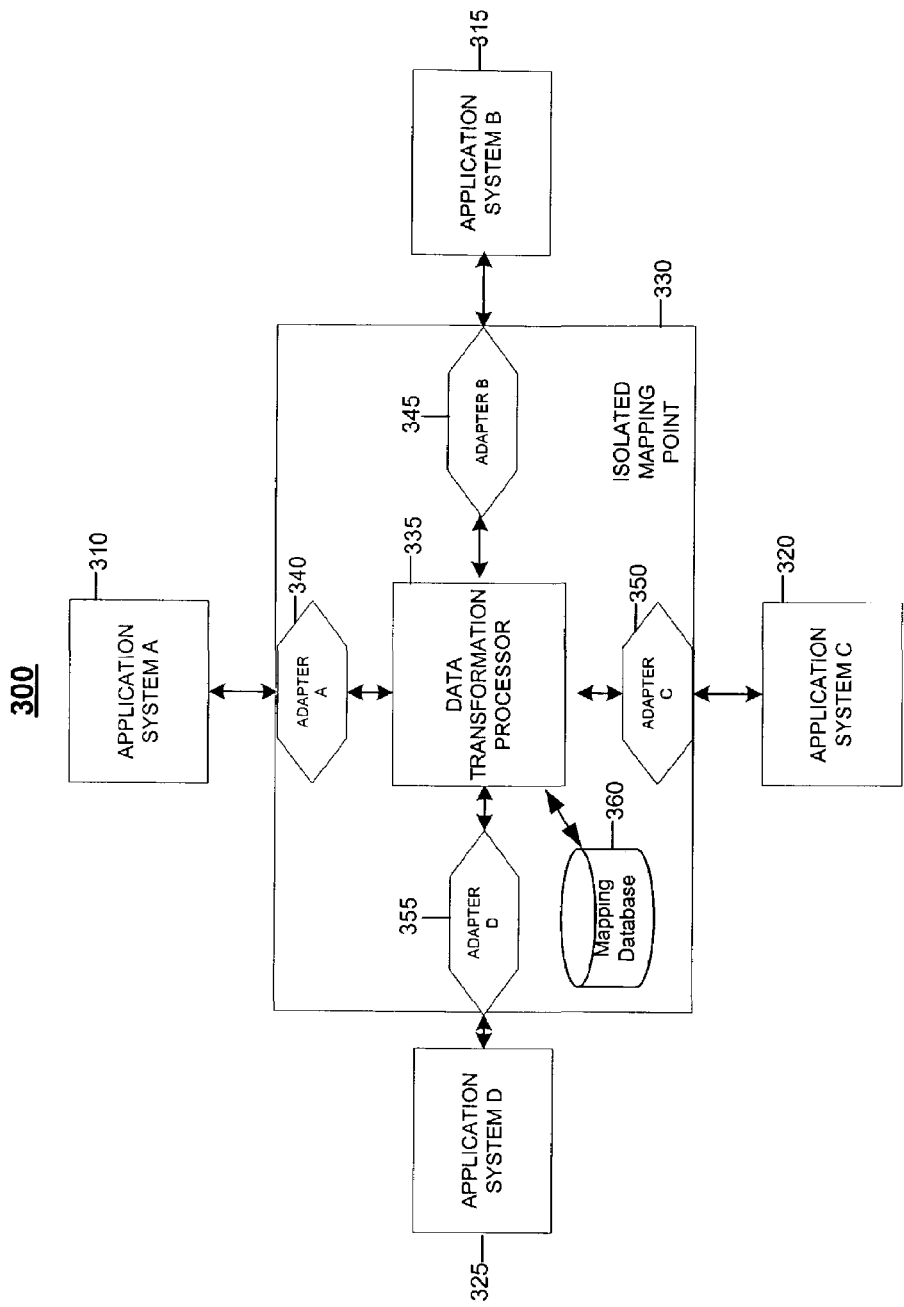
FIG. 3 is a diagram of an integrated system where four different application systems are integrated via an isolated mapping point.

FIG. 3 depicts an integrated system 300 where four different application systems 310, 315, 320, and 325, are integrated via an isolated mapping point 330. The isolated mapping point 330 isolates the data exchange between any two application systems, such as application system 310, application system 315, application system 320, or application system 325.

Data is exchanged only between an application system and the isolated mapping point 335. The isolated mapping point 335 processes the data from one application system and passes the data as required to other application systems. No direct data exchange between one application system and another application system need take place in the application system network having this structure. This type of data exchange structure may be referred to as a hub structure.

The isolated mapping point 330 includes a data transformation processor 335, a series of adapters 340, 345, 350, and 355, and a mapping database 360. The mapping database 360 also may be referred to as a map data store or a mapstore.

The data transformation processor 335 uses an appropriate adapter, such as adapter 340, adapter 345, adapter 350, and adapter 355, and the mapping database 360 to perform the data transformations needed to exchange data between the application systems 310, 315, 320, and 325. An adapter is a set of executable instructions (for example, a program module) that allows a connection to be made from an application system to an external system (here, the isolated mapping point 330). An adapter is used to translate the protocol and data structure of the application system to that of the external system to which the application system is connected. A particular type of adapter (for example, a dedicated adapter) exists for each external system to which an application system is connected. For example, the isolated mapping point 330 uses adapter 340 to translate data received from application system 310 into a format that can be processed by a receiving system, such as the application system 315.

The isolated mapping point 330 receives the data from a sending application system and sends the data to the appropriate application systems. For example, data sent from application system 310 to application system 315 proceeds from application system 310 to isolated mapping point 330. Isolated mapping point 330 receives the data and uses an appropriate adapter (here, adapter 345) to translate the data into data specific to the application system 315. The isolated mapping point 330 sends the application-specific data to application system 315, where the data is received and processed.

Figure 4:
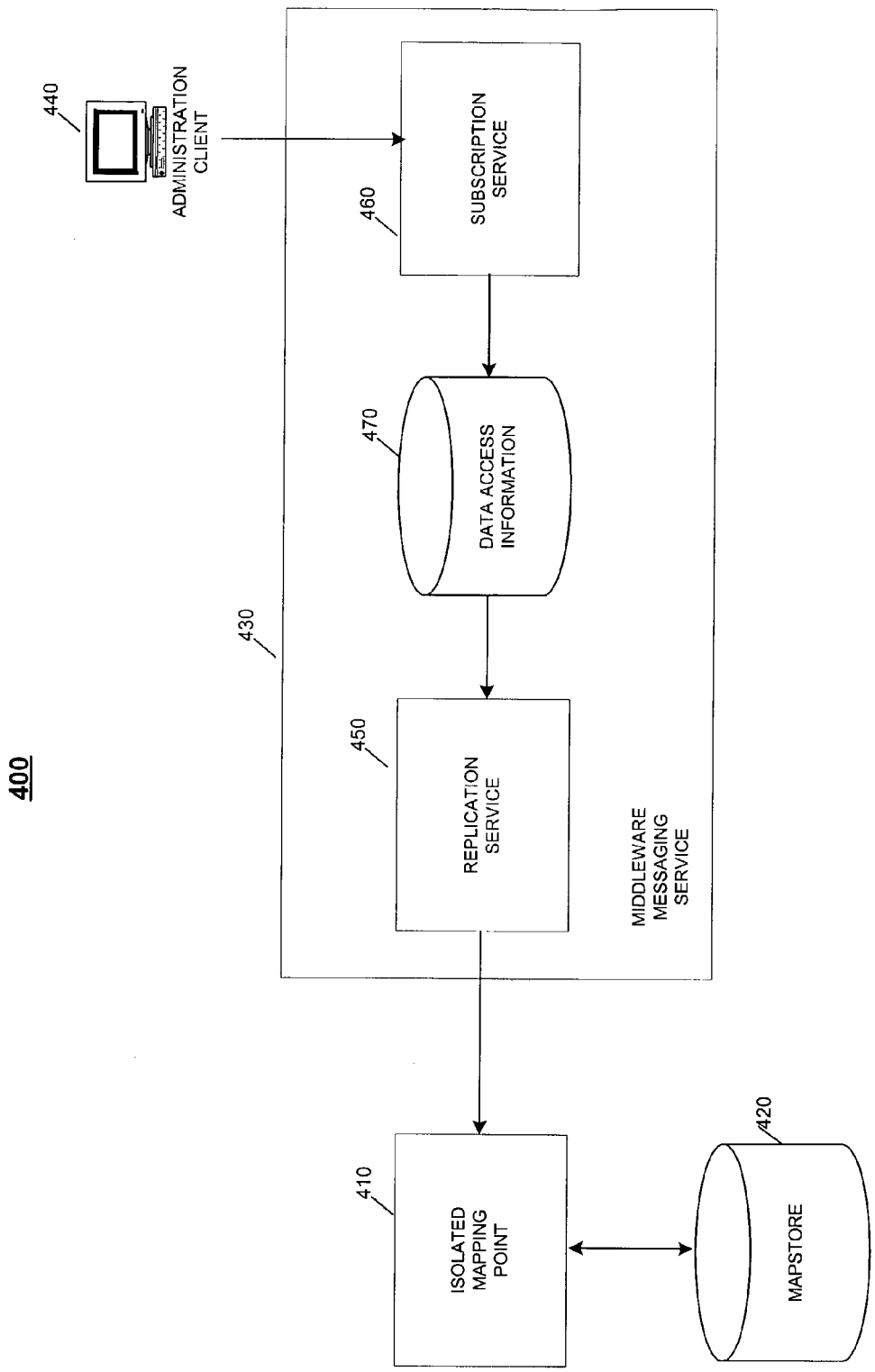
FIG. 4 is a diagram of a process to provide data to a mapping data store used by an isolated mapping point.

FIG. 4 describes a process 400 to provide mapping data used by an isolated mapping point 410. The mapping data is stored in a mapstore 420 that is accessible to the isolated mapping point 410. Aspects of the process are performed by the isolated mapping point 410, a middleware messaging service 430, and an administration client 440. The isolated mapping point 410 may constitute an implementation of the isolated mapping point 110 in FIG. 1, the isolated mapping point 210 in FIG. 2, or the isolated mapping point 330 in FIG. 3.

As is conventional, the middleware messaging service 430 is a data maintenance service that synchronizes data stored in different data management systems. Each of the data management systems may be associated with the same application system, or each of the data management systems may be associated with different application systems. In general, the middleware messaging service 430 uses a flow control process to direct messages between the various data management systems. The middleware messaging service 430 includes a replication service 450 and a subscription service 460.

The replication service 450 is used to provide data from one data management system to another data management system. For example, a replication service may provide data from a central data management system of an application system to partially-replicated data management nodes of the application system. This may be useful, for example, when a customer relationship management system uses a centralized data management system to store a complete copy of the data and to provide a subset of the data to various laptop computers, with each laptop computer receiving a subset of data. When data is updated in the central data management system, the replication service 450 receives a message with the updated data and sends the updated data to one or more data management nodes (such as a data management system on a laptop computer) based on data access information 470 stored in the middleware messaging service.

The subscription service 460 is used to update the data access information 470 to indicate the particular data in one data management system that is to be sent (or replicated) to another data management system or other data management systems. For example, the data access information 470 may indicate that sales data for a particular sales region are to be sent to particular data management nodes, whereas sales data for a different sales region are to be sent only to other data management nodes. The data access information 470 also may indicate that all sales data are to be sent to yet other data management nodes.

The middleware messaging service 430 may service a customer relationship management system. In such a case, the service 430 may replicate data from a centralized data management system to a large number of data management nodes. Each data management node may reside on a portable computing device, such as a laptop computer or a personal digital assistant, and uses a portion of the centralized data management system. For example, a laptop computer may contain only some of the data stored in a centralized data management system that stores the complete data. When the middleware messaging service 430 receives from the centralized data management system a message that indicates that a particular data update for the data access information 470, the middleware messaging service 430 accesses the data access information 470 to determine the data management nodes that are to receive the particular data update, and then sends a replication message with the update data to each data management node that is to receive the particular data update.

The mapstore 420 for the isolated mapping point 410 is updated using the middleware messaging service 430 using the same process as used to update any other data management system that uses the middleware messaging service 430. The administration client 440 uses the subscription service 460 to identify the isolated mapping point 410 as a data management system that uses the middleware messaging service 430, and to identify the types of data changes that the isolated mapping point 410 is to receive using the middleware messaging service 430. The subscription service 460 updates the data access information 470 to reflect the types of data changes that the isolated mapping point 410 is to receive. In other words, the isolated mapping point 410 subscribes to the types of data changes it needs to be stored in the mapstore 420.

When a data change occurs in one of the data management systems that uses the middleware messaging service 430, the replication service 450 sends the data change to the isolated mapping point 410 using the data messaging process available in the replication service 450. The isolated mapping point 410 receives the data. The sent data includes a unique key that identifies the data in the sending system and values in other types of data fields. The isolated mapping point 410 stores in the mapstore 420 the unique key and other data values sent in the message. The isolated mapping point 410 generally does not store other message information in the mapstore 420.

The process 400 may be used to provide the mapstore 420 with the application-specific data needed by the isolated mapping point 410 to perform data transformations. For example, the isolated mapping point 410 may subscribe to receive reference table changes from a data management system associated with an application system. The reference table may be used in a value mapping, as described below with respect to FIG. 7. The process 400 also may be used to send data to the isolated mapping point 410 for data exchange with another application system. The isolated mapping point 410 may store the data exchanged in the mapstore 420. The stored data may be used by the isolated mapping point 410 as part of a completion strategy or a back transformation process to correct data inconsistencies between application systems involved in a data exchange. The completion strategy and back transformation process are described below in FIGS. 8-10.

The schema used by the mapstore 420 may be the same as, or different from, the schema used by the application system that provided the data or the schema used by the middleware messaging service 430 (if the middleware messaging service 430 uses a different schema from the application system). Using a mapstore based on XML may allow greater flexibility of the data structures used and may help decrease the programming maintenance of the data exchange software required. For example, the data structure maintenance may be reduced or eliminated.

Figure 5:
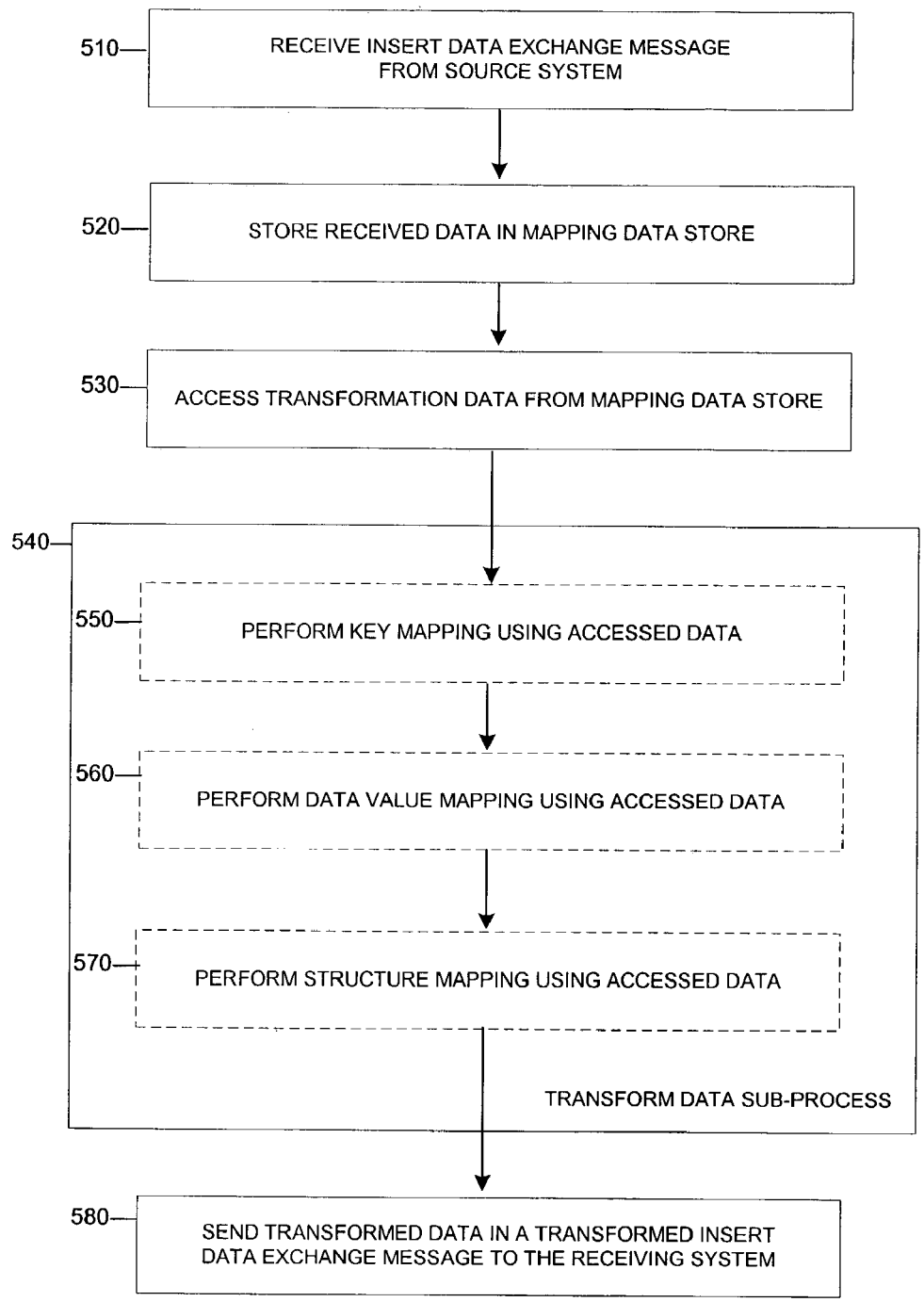
FIG. 5 is a flow chart of a process used by an isolated mapping point to transform a data exchange message received from a sending application system that identifies data to be inserted into an application system that receives the transformed message.
Figure 6:
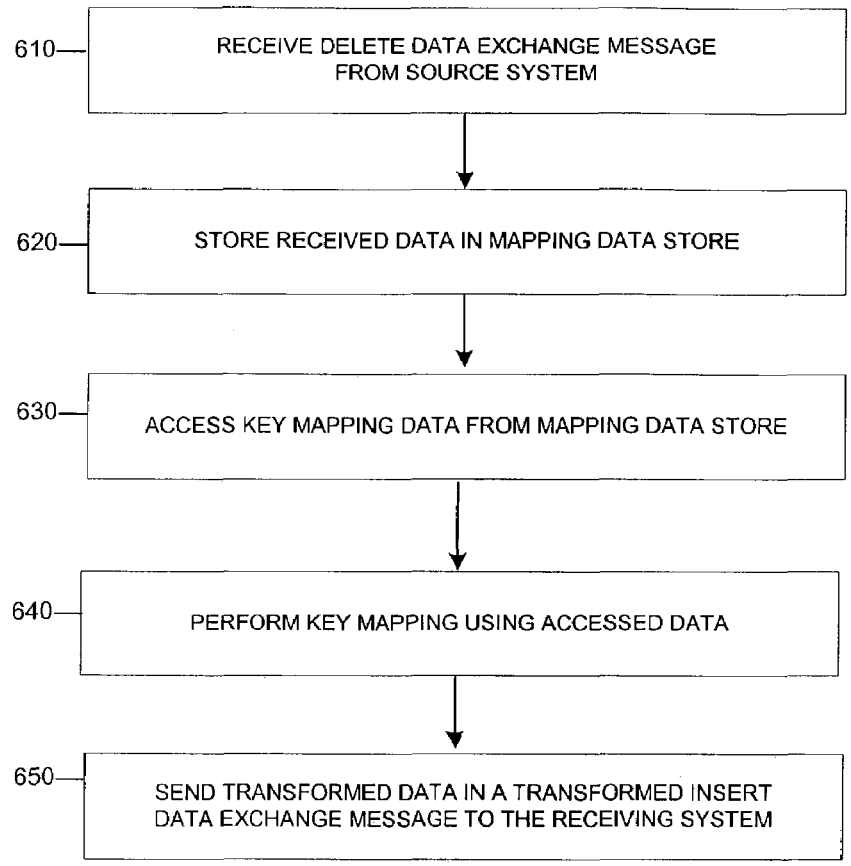
FIG. 6 is a flow chart of a process used by an isolated mapping point to transform a data exchange message received from a sending application system that identifies data to be deleted from an application system that receives the transformed message.
Figure 7:
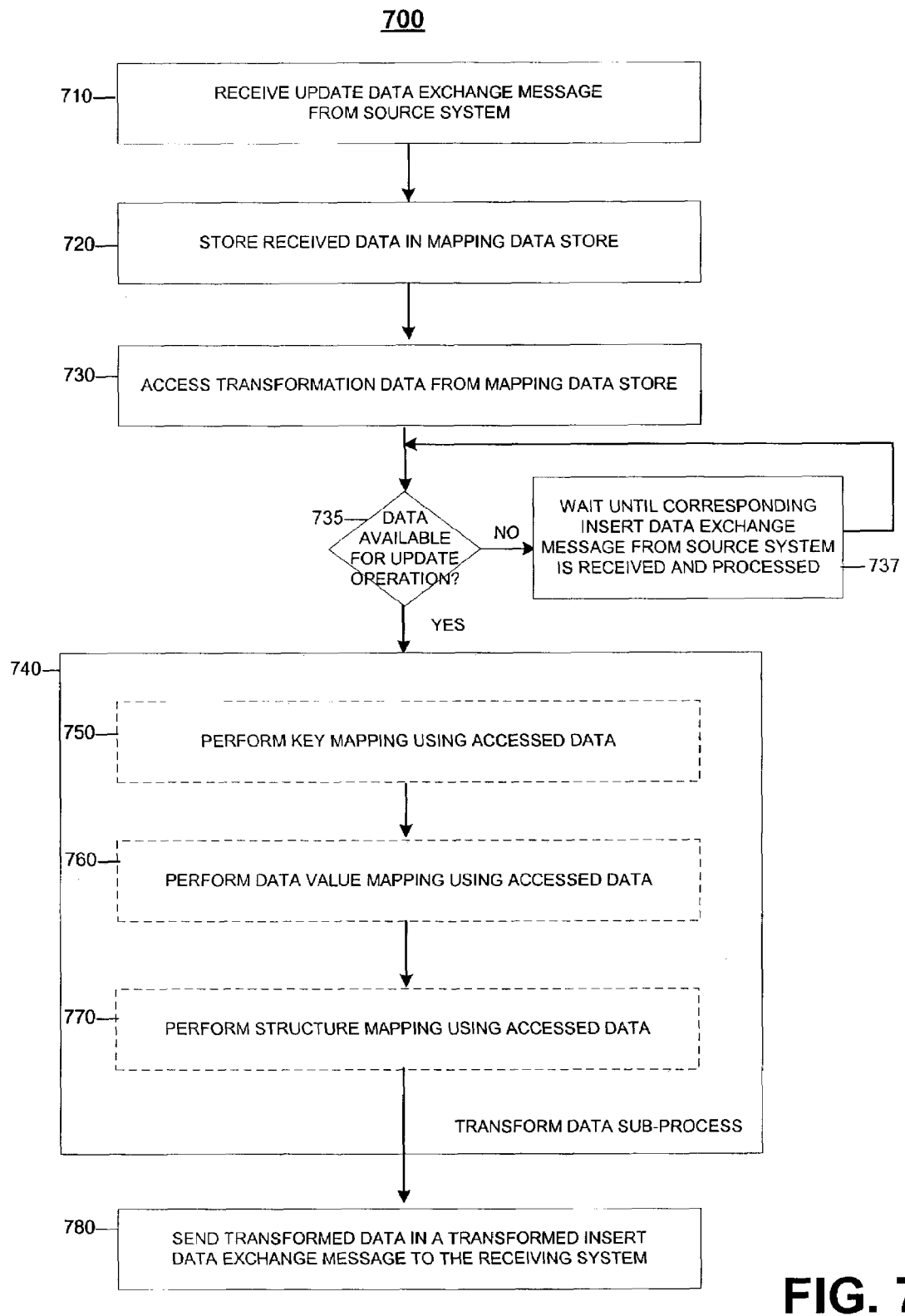
FIG. 7 is a flow chart of a process used by an isolated mapping point to transform a data exchange message received from a sending application system that identifies data to be updated in an application system that receives the transformed message.

FIGS. 5-7 each show a different data transformation process that an isolated mapping point may perform. For illustrative purposes, a particular implementation of an isolated mapping point is used in the processes shown in FIGS. 5-7. In the particular implementation, the isolated mapping point receives a message that identifies the data in a sending system to be transformed into data usable in a receiving system. The message includes a message header and a message body. The message header includes control information used by the isolated mapping point, such as the identification of whether the data exchange message is an insert data exchange message that identifies data to be inserted into a receiving system, a delete data exchange message that identifies data to be deleted from a receiving system, or an update data exchange message that identifies data to be updated in a receiving system. The message body includes data being exchanged between two application systems. The data is organized into a series of data fields that, in turn, may be organized into record. One or more records that use an identical structure may be organized into a segment. A message includes a root segment that is a top-level segment to which other segments may be related.

FIG. 5 depicts a process 500 used by an isolated mapping point to transform a data exchange message received from a sending application system that identifies data to be inserted into an application system that receives the transformed message. This may occur, for example, when a new record has been entered in the sending application and the data in the new record is needed by the receiving application. The isolated mapping point may constitute an implementation of the isolated mapping point 110 in FIG. 1, the isolated mapping point 210 in FIG. 2, the isolated mapping point 330 in FIG. 3, or the isolated mapping point 410 in FIG. 4.

The process 500 begins when the isolated mapping point receives, or otherwise accesses, an insert data exchange message from a sending application system (step 510). The sending application system also may be referred to as a source system or a sending system. An "insert" data exchange message indicates that the message contains data from the sending system that is to be inserted in the receiving system. The insert data exchange message includes a key that uniquely identifies the data in the message and other data values to be inserted as a new record (or other type of data collection) in the receiving system.

The isolated mapping point stores the received data, including the key and other data values (step 520). The received data is stored in a mapping data store, such as data 158 in FIG. 1, the mapstore 225 in FIG. 2, the mapping database 360 in FIG. 3, and the mapstore 420 in FIG. 4, associated with the isolated mapping point. Generally, the isolated mapping point does not store the control information or other information that is included in the message header. The copy of the received data may be used, for example, for a back transformation of the data (as further described below in FIGS. 8 and 9), which generally does not require the use of the message header information.

The isolated mapping point accesses transformation data from the mapping data store (step 530). The transformation data may include, for example, data used to transform key values, transform other types of data values, and transform the structure of the received data. The transformation data may be created and stored in the mapstore, for example, by using the process 400 in FIG. 4. Alternatively, the data may be created and stored in the mapstore by an interface with the receiving system designed to update the mapstore data.

The isolated mapping point performs one or more steps, within a transform data sub-process 540, which steps are required to transform the received data such that the data is able to be inserted into a data management system used in the receiving application system. The transform data sub-process 540 includes performing key mapping using the accessed data (step 550), performing data value mapping using the accessed data (step 560), and performing structure mapping using the accessed data (step 570).

When the isolated mapping point performs key mapping using the accessed data (step 550), the isolated mapping point maps the key received in the insert data exchange message to a key that is usable by the receiving system. In general, data stored by different application systems also may use different primary key structures to uniquely identify a particular data object. For example, one application system may use a proprietary key numbering system in which primary keys are created by sequentially allocating numbers within an allocated number range. Another application system may use a GUID ("globally unique identifier") key. In order to accurately exchange data, the key values may need to be mapped from one system to another system. This may be accomplished, for example, by storing an association between a key in the sending system and a corresponding key in the receiving system.

The isolated mapping point generates an appropriate key for use in the receiving system by using key mapping information stored in the mapping data store. The key mapping information may include, for example, a table or list with translation data for keys. The key mapping information also may include a list of available keys to be assigned to inserted data. The isolated mapping point also may include schema-specific or application-specific logic for generating a key for a particular application system. An association between the received key and the generated key may be created and stored in the mapstore.

When the isolated mapping point performs data value mapping using the accessed data (step 560), the isolated mapping point maps the source data into data usable by the receiving system. The isolated mapping point performs the data value mapping using data translation tables or other data that helps data values to be matched across the application systems. For example, the name of an object used in one system may be different than the name used for the same object in a different system. An object named "customer" in one system may correspond to an object named "buyer" in another system. One application system may store data values representing a particular attribute using a different field type and length from that used by a different application system. An application system may use different data codes than another application system. For example, one system may store a country value using a numeric code (for example, a "1" for the United States and a "2" for the United Kingdom) whereas another system may store a country value as a textual abbreviation (for example, "U.S." for the United States and "U.K." for the United Kingdom). The country codes in the two systems may be identified as representing the same attribute and then a translation table made available that translates the various possible values from one system to another system (for example, "1" to "U.S." and "2" to "U.K."). The importance of a customer may be classified by an alphabetic ranking in one application system with "A" as most important and "C" as least important whereas the importance of a customer may be classified as "important" or "standard" in another application system. These content or value differences must be mapped so that the isolated mapping point is able to translate the data received from one application system into data that is able to be understood by another application system. The value differences generally are manually mapped and stored in the mapstore when the application integration is designed. The value difference mapping then is used repeatedly by the isolated mapping point to perform a data translation for the transformation of received data.

The isolated mapping point also may perform data value mapping to match data values between an application system and a common document object schema. The isolated mapping point may use value mapping information that includes a table or series of tables that translates the content of data from an application system to the common document object schema.

When the isolated mapping point performs structure mapping using the accessed data (step 570), the isolated mapping point maps the source data into data usable by the receiving system by transforming the structure of the received data. The isolated mapping point transforms the structure of the data using the structure mapping information stored in the mapping data store. For example, in one application system a customer address may be included in the root segment (or header) of a customer object whereas in another application system (or in the common document schema) the customer address may be included as a dependent object for a customer object. The isolated mapping point transforms customer address data to be a dependent object to a parent customer object, so that the receiving system is able to use the data.

The isolated mapping point may also perform field mapping, such as single-field mapping and multiple-field mapping. Single-field mapping includes one-to-one mapping and cross-mapping. One-to-one single-field mapping refers to mapping data from one application system to another application system when the name, data type, and data length of the data field in one system is equal to the name, data type, and data length of the data field in the other system. In such a case, a single-field translation table or list may show the correspondence and equivalency of the two data fields. In some implementations, the isolated mapping point may identify the corresponding and equivalent fields without using a single-field translation table. The isolated mapping point may be able to use a data dictionary or other schema information to match the name, data type and data length of the corresponding and equivalent fields.

The isolated mapping point also may perform cross-single-field mapping. Cross-single-field mapping refers to single field mapping for which one or more of the name, data type, or data length do not match in the two application systems. Cross-single-field mapping may also be referred to as cross-mapping. Cross-mapping transforms data from a sending system data structure to a receiving system data structure when the receiving system structure does not match the sending system structure. When the name of the data field is different in the sending system structure and the receiving system structure, the isolated mapping point may use a name translation table to access the name of the corresponding receiving system structure for the name of the sending system structure.

The isolated mapping point also may use cross-mapping information in the structure mapping information to help translate character, text, string or other types of non-numeric data (collectively, "character data") when the sending system and the receiving system use different data lengths for the same data field. When a sending system structure is a smaller data length than the receiving system structure, no structure mapping is needed because the source data fits into the length of the receiving data structure. For example, the shorter sending-structure character field length will fit into the longer receiving-structure character field length.

Generally, when the data type of the sent data is of the type of date, time or Boolean, cross-mapping is not necessary. This is true because those data types are of a fixed length in both structures because most data management systems use a standard way of storing those types of data.

When a sending system structure permits a longer character field length than the receiving system structure permits, however, the sending system character data may not be able to be fully stored in the smaller receiving structure. In such a case, the isolated mapping point stores the character data in the mapping data store such that the complete longer character field value is available to be sent to the sending system for a back transformation, if necessary. The back transformation process is described below in FIGS. 8 and 9. The storage of the complete data values in the mapping data store may be referred to as a completion strategy.

The isolated mapping point also may perform multiple field mapping. One type of multiple field mapping occurs when a field in a sending system structure is transported to more than one field of the receiving structure. This may be referred to as redundant mapping. The isolated mapping point uses multiple single field mappings to accomplish a redundant mapping. A more complex type of multiple field mapping occurs in a one-to-many mapping in which a field in the sending system structure may be segmented into several fields in the receiving system structure. The isolated mapping point uses value mapping information (as previously described with respect to step 560) to perform the one-to-many mapping.

The isolated mapping point also performs field segment mapping. One type of field segment mapping occurs when each one of several sending data fields is transferred to a new record in the receiving system. For example, a sending system may include customer information and three addresses in a sending record. The isolated mapping point transforms the sending record into a receiving system customer record and three receiving system address records, each receiving system address record being a dependent object that refers to the customer record.

The isolated mapping point also may resolve differences in cardinality when performing structure mapping. Cardinality refers to the number of record occurrences that are permitted to be associated with one occurrence of a related record. For example, a customer may be permitted to have only one address in one application system and may be permitted to have more than one address in another system.

The isolated mapping point also may perform object mapping. For example, the mapping data store may be a table or list that translates a sending structure object to a receiving structure object. Using this structure mapping information, the isolated mapping point may be detect that a "buyer" object in one system corresponds to a "customer" object in another system. The isolated mapping point may be able to transform the received buyer object to a customer object by applying value mapping information, structure mapping information, and key mapping information.

After the transform data sub-process (step 540), the isolated mapping point sends to the receiving system the transformed data in a transformed "insert" data exchange message (step 580). The transformed data received by the receiving system is stored and made available to the receiving system.

FIG. 6 depicts a process 600 used by an isolated mapping point to transform a data exchange message received from a sending application system that identifies data to be deleted from an application system that receives the transformed message. The process 600 begins when the isolated mapping point receives, or otherwise accesses, a "delete" data exchange message from a source application system (step 610). A delete data exchange message indicates a key for data in the sending system that identifies the data to be deleted by the receiving system.

The isolated mapping point stores the received data, including the key and any other received data values (step 620). The received data is stored in a mapping data store. The copy of the data may be used, for example, for a completion strategy or a back transformation of the data, such as when the data is sent from the receiving system to the sending system (as further described below in FIGS. 8-10).

The isolated mapping point accesses key mapping data from the mapping data store (step 630) and performs key mapping using the accessed data (step 640). This may be accomplished, for example, by accessing a table or list with translation data for keys used by the sending system and the receiving system. The isolated mapping point then sends to the receiving system the transformed data in a transformed "insert" data exchange message (step 650). The data that is identified by the transformed key and is stored in the receiving system is deleted by the receiving system.

FIG. 7 depicts a process 700 used by an isolated mapping point to process a message that is received out of order. This process may be used, for example, when the isolated mapping point receives an update message before the isolated mapping point receives an insert message to which the update message relates. An update message identifies data to be modified for a record that exists in an application system. For example, an update message may identify a new telephone number for a particular customer. When an update message is received before a corresponding insert message, the isolated mapping point uses a different process to handle the out-of-order update message based on whether the update data includes all of the data required for an insert and, if not, whether the isolated mapping point is able to enrich the data so that the data may be inserted in the receiving system.

When all of the data required by the update operation is included in the update record or the isolated mapping point is able to enrich the received data such that the data may be inserted in the receiving system, the isolated mapping point performs a direct insert procedure that inserts a temporary record into the application data portion of the mapstore. The temporary record inserted is used for the transformation of the update data received in the data exchange message. The isolated mapping point then sends the transformed message to the receiving system. When the insert record is later received by the isolated mapping point, the isolated mapping point overwrites the temporary record in the application data portion of the mapstore with the inserted record and sends the inserted record to the receiving system. This is particularly advantageous when the sending system uses net communication to send only the changed data and the target system uses gross communication such that the receiving system expects to receive all of the data in the data record (regardless of whether the data has been changed).

In contrast, when the data required by the update operation is not included in the update record and the isolated mapping point is not able to enrich the data for insertion in the target system, the isolated mapping point may use a confirmation procedure, such as process 700 shown in FIG. 7. The process 700 transforms the data in an update message and sends the update message to the receiving system only when a corresponding insert message is received from the sending system. In some cases, the confirmation procedure may result in overflow of the message queue at the isolated mapping point. To prevent message queue overflow, parallel instances of the isolated mapping point may be operated.

Generally, the process 700 transforms a data exchange message received from a sending application system that identifies data to be updated in an application system that receives the transformed message. More specifically, the process 700 begins when the isolated mapping point receives, or otherwise accesses, an "update" data exchange message from a source application system (step 710). An update data exchange message indicates a key for data in the sending system to be updated and also identifies the data values to be updated in the receiving system. This may be referred to as net communication or delta communication because only the changed data field values are sent. In contrast, gross communication or whole-record communication refers to a strategy in which all of the data field values (both the data field values that are updated and the data field values that are unchanged) for the record to be updated are sent.

The isolated mapping point stores the received data, including the key and at least the updated data field values (step 720). The received data is stored in a mapping data store, associated with the isolated mapping point. The copy of the received data may be used, for example, for back transformations of the data when messages are sent from the receiving system to the sending system (as further described below in FIGS. 8 and 9).

The isolated mapping point accesses transformation data from the mapping data store (step 730) and, using the accessed data, determines whether the appropriate record data is available for the update operation to be completed (step 735). The isolated mapping point does not need to determine whether the necessary transformation data is available because, by definition, an isolated mapping point includes the transformation data necessary for data exchange to occur. The determination of whether the isolated mapping point includes the appropriate record data may be accomplished, for example, by determining whether an insert message has been performed for the data prior to the receipt of the update data exchange message. That determination may be made based on whether data that corresponds to the received key is present in the mapping data store. When the appropriate record data for the update operation is not available (step 735), the isolated mapping point waits until a corresponding data exchange message from the sending system is received and processed (step 737).

When the appropriate record data for the update operation is available (step 735), the isolated mapping point performs one or more steps in a transform data sub-process 740, which may be the same as or similar to the transform data sub-process 540 in FIG. 5. For example, the isolated mapping point may perform key mapping using the accessed data (step 750), may perform data value mapping using the accessed data (step 760), and/or may perform structure mapping using the accessed data (step 770).

The isolated mapping point then sends to the receiving system the transformed data in a transformed "update" data exchange message (step 780). The transformed data received by the receiving system is used to update the corresponding stored record (that may be identified using the transformed key) and made available to the receiving system.

Figure 8:
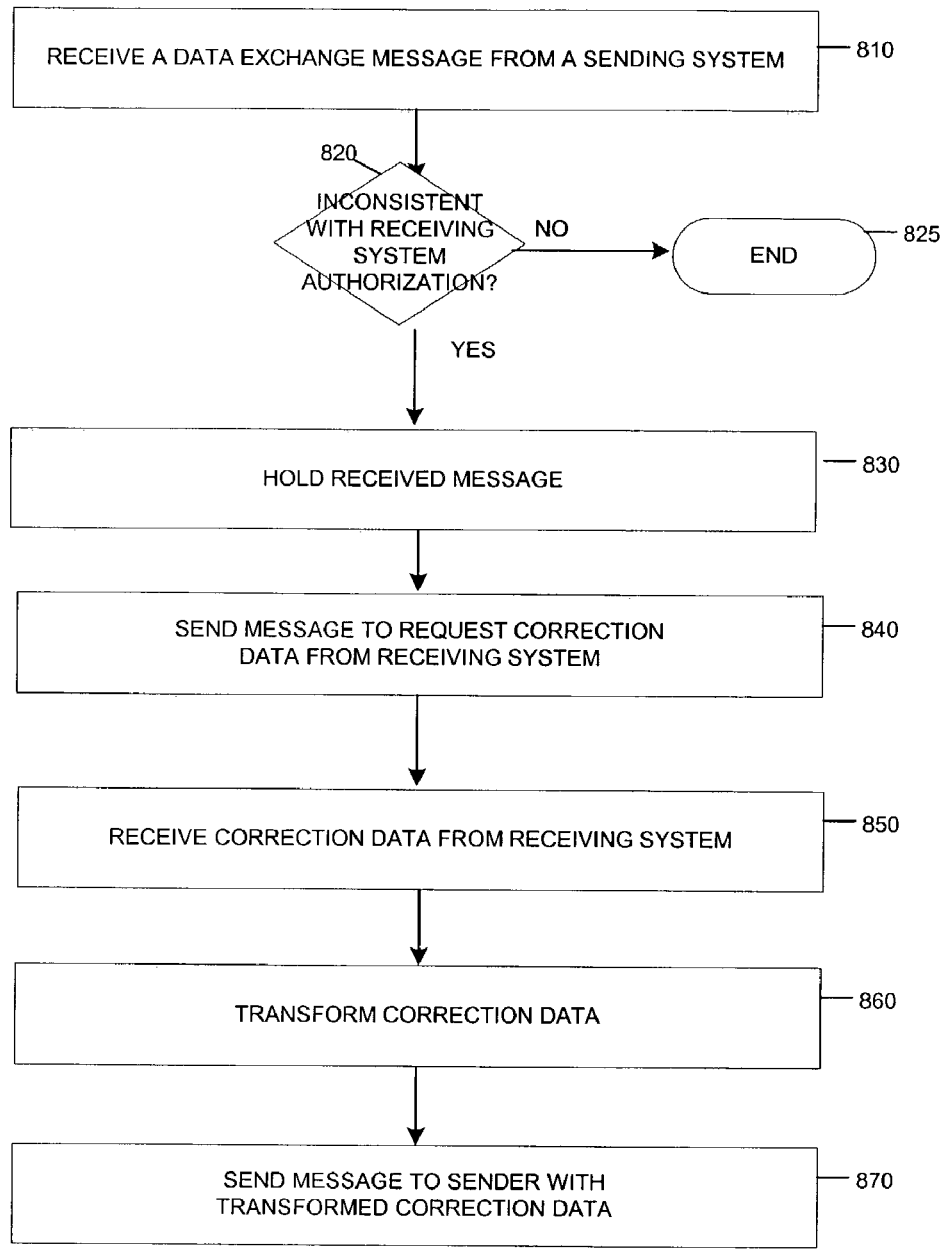
FIG. 8 is a flow chart for a back transformation process to provide data to correct data inconsistency caused by uneven authorizations in two application systems that exchange data.

FIG. 8 illustrates a back transformation process 800 for providing data to correct data inconsistency that may be caused by, for example, uneven authorizations in two application systems that exchange data. The correction of inconsistent data may be referred to as synchronizing, or harmonizing, data. A back transformation process may be particularly useful when two application systems use inconsistent authorization rules. The use of inconsistent authorization rules in application systems may be referred to as uneven authorization. An example of uneven authorization occurs when an application system does not permit the deletion of a particular object type, whereas another application system allows the deletion of the same object type. The difference in the delete authorization rule (that is, the uneven authorization) may lead to inconsistent data, namely, when one application system deletes the object data and the corresponding object data remains in the other application system that does not permit the object type to be deleted.

When an isolated mapping point receives a delete message that is inconsistent with the authorization rules of the receiving system, the isolated mapping point may not send the delete message to the receiving system. Instead, the isolated mapping point may send the sending system an insert message with the deleted data to correct the inconsistency in the sending system. This may be referred to as an exchange of contradictory contents. The exchange of contradictory contents is one type of back transformation. The isolated mapping point may delete the inconsistent message. In some implementations, the isolated mapping point may alternatively send the received deletion message to the receiving system, and the receiving system may perform the back transformation to send a correction message to the sending system.

In this implementation, the isolated mapping point uses the "last-one-wins" strategy to resolve the data inconsistency created by the authorization conflict level in the two application systems. An application system may use a last-one-wins strategy to resolve a data conflict between the application systems. The last-one-wins strategy describes an approach that stores a message received based on the order in which the message was received. An application system employing a last-one-wins strategy stores the last message received, even when the last message is inconsistent with a previously received message. For example, an insert-record message may be received and the data associated with the insert-record message stored. The receiving application system stores the data associated with the insert-record message even when the insert-record message is inconsistent with the previously-received delete message that deleted the same data as inserted by the insert-record message. The insert-record message is performed because the insert-record message was received after the delete message was received, and, thus the last modification (here, the insert operation) "wins" over the previous modification (here, the delete operation) such that the last modification persists in the data management system. The last-one-wins strategy is so named because a later-received data exchange message (the "last-one") may reverse the data modification previously performed in response to a previously-received data exchange message.

For example, a groupware system and a customer relationship management system may exchange customer data. The groupware system permits the deletion of customer data, and the customer relationship management system does not. When customer data has been deleted in the groupware system, the groupware system sends a delete message to the isolated mapping point. Instead of transforming the delete message and sending the message to the customer relationship management system, the isolated mapping point sends a copy of the deleted customer data back to the groupware system as an insert message. The groupware system receives the customer data from the isolated mapping point and stores the customer data. In this way, the consistency between the groupware system and the customer relationship management system is restored.

Instead of using the last-one-wins strategy, the isolated mapping point alternatively may serve as a lead validation system. This strategy may be referred to as a validation strategy. In a validation strategy, a message is replicated to other application systems only after the lead validation system (that is, the isolated mapping point) validates the message. When the isolated mapping point cannot validate the message, the isolated mapping point rejects the message and sends a correction message to the sending system to roll back the sending system. As such, the isolated mapping point may serve as a lead validation system.

The "last-one-wins" back transformation process 800 begins when an isolated mapping point receives a data exchange message from a sending system (step 810). The data exchange message may be an insert data exchange message, a delete data exchange message, an update data exchange message, or another type of data exchange message. The isolated mapping point determines whether the received data exchange message is inconsistent with the receiving system authorization, particularly for data management operations (such as insert, update, or delete data) (step 820). If so, the process 800 ends (step 825). However, if the received data exchange message is inconsistent with the receiving system authorization (step 820), the isolated mapping point holds the received message and does not forward the received message to the receiving system (step 830). The isolated mapping point then sends a message to request correction data from the receiving system (step 840). When necessary, the isolated mapping point transforms the primary key associated with the data included in the message received in step 810 to identity and request the corresponding record in the receiving system.

When the isolated mapping point receives the correction data from the receiving system (step 850), the isolated mapping point transforms the correction data for use by the sending system (step 860). For example, the receiving system may perform key mapping, value mapping, structure mapping, or object mapping to transform the correction data to a record that may be used to update the sending system data, as described previously. The isolated mapping point then sends to the sending system a message with transformed correction data to correct the inconsistency between the two application systems (step 870).

Figure 9:
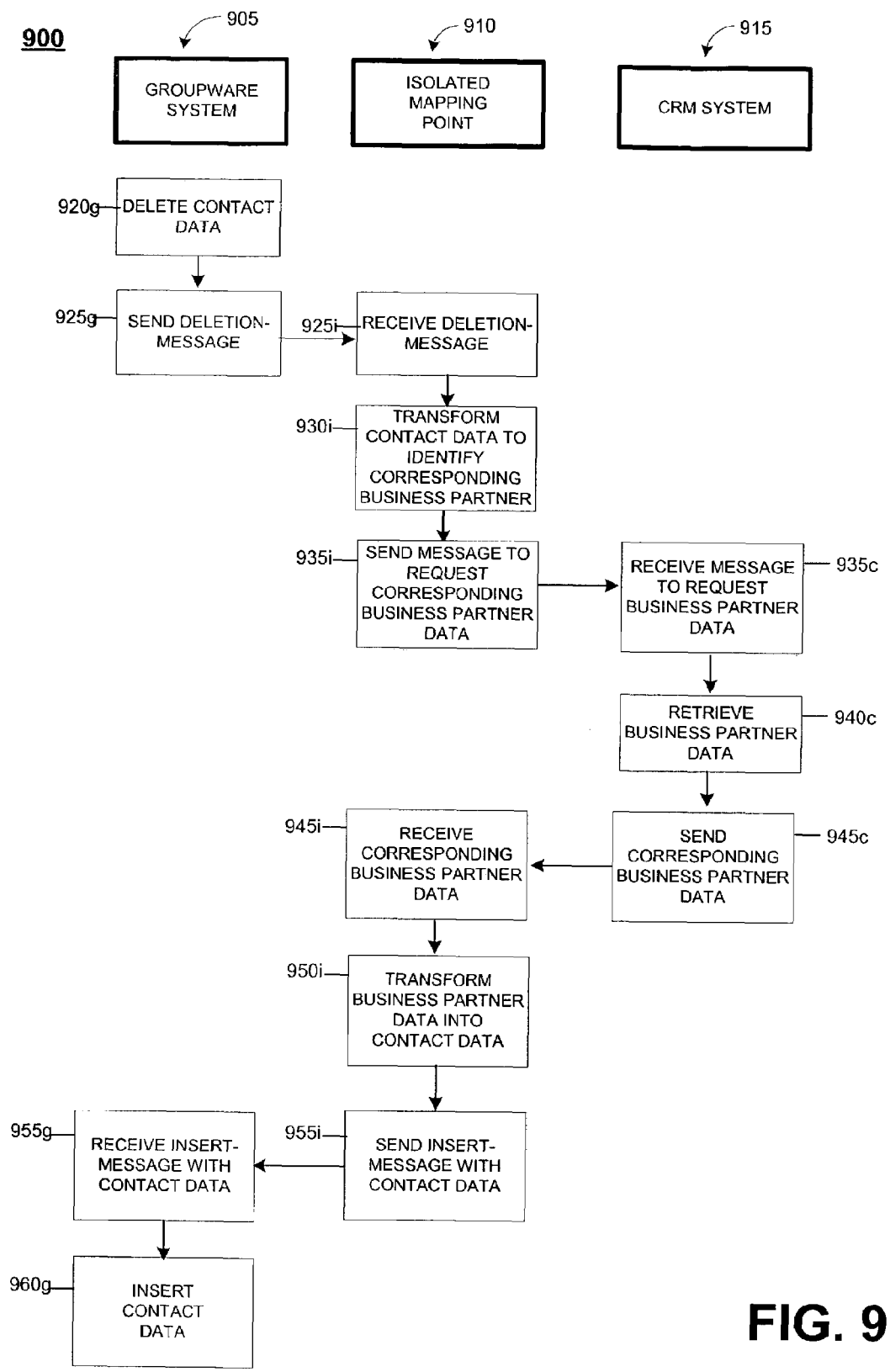
FIG. 9 is a diagram of a back transformation process performed by a groupware system, an isolated mapping point, and a customer relationship management system.

FIG. 9 illustrates a more specific example of a "last one wins" back transformation process 900. The back transformation process 900 may be used to provide data to correct a data inconsistency that may be caused by uneven authorizations between a groupware system and a customer relationship management (CRM) system. The back transformation process 900 involves a groupware system 905, an isolated mapping point 910, and a CRM system 915. Using the isolated mapping point 910, the CRM system 915 exchanges data with the groupware system 905, through a groupware server, to provide the groupware system with contact information from the CRM system. A contact object in the groupware system 905 may correspond, for example, to a business partner object in the CRM system 915. Examples of a groupware server include a Microsoft Exchange Server by Microsoft Corporation of Redmond, Wash. and a Lotus Domino Groupware Server by IBM Corporation of White Plains, N.Y. The data exchange between the groupware system 905 and the CRM system 915 is bi-directional such that contact data is transferred from the groupware system 905 to the CRM system 915 and from the CRM system 915 to the groupware system 905. The isolated mapping point may constitute an implementation of the isolated mapping point 110 in FIG. 1, the isolated mapping point 210 in FIG. 2, the isolated mapping point 330 in FIG. 3, or the isolated mapping point 410 in FIG. 4.

The process 900 begins when the groupware system 905 deletes a contact (step 920*g*). The groupware system 905 in this example is a non-invasive system, which means that the groupware system is not capable of being modified to prevent the deletion of a contact and so the deletion is permitted. The groupware system 905 sends to the isolated mapping point 910 a deletion message with the contact data (step 925*g*).

The isolated mapping point 910 receives the deletion message with the contact data (step 925*i*). The isolated mapping point 910 transforms the contact data as necessary to identify the business partner that corresponds to the deleted contact (step 930*i*). For example, the isolated mapping point 910 may use key mapping information, as described previously, stored in a mapstore to identity the primary key of the business contact that corresponds to the deleted contact. The isolated mapping point 910 sends a message to the CRM system 915 to request business partner data that corresponds to the deleted contact (step 935*i*).

The CRM system 915 receives the message to request business partner data that corresponds to the deleted contact (step 935*c*). The CRM system 915 retrieves the corresponding business partner data (step 940*c*) and sends it to the isolated mapping point 910 (step 945*c*).

The isolated mapping point 910 receives the corresponding business partner data (step 945*i*) and transforms it into contact data (step 950*i*). For example, the isolated mapping point 910 may use information accessed from the mapstore to perform key mapping, value mapping, and structure mapping to transform the business partner data into contact data. The isolated mapping point 910 then sends to the groupware system 905 an insert message with contact data that was transformed from the business partner data (step 955*i*).

The groupware system 905 receives the insert message with the contact data (step 955*g*) and inserts the contact data to its data management system, or otherwise stores the contact data (step 960*g*). The insert restores the consistency between the contact data in the groupware system 905 and the business partner data in the CRM system 915.

Figure 10:
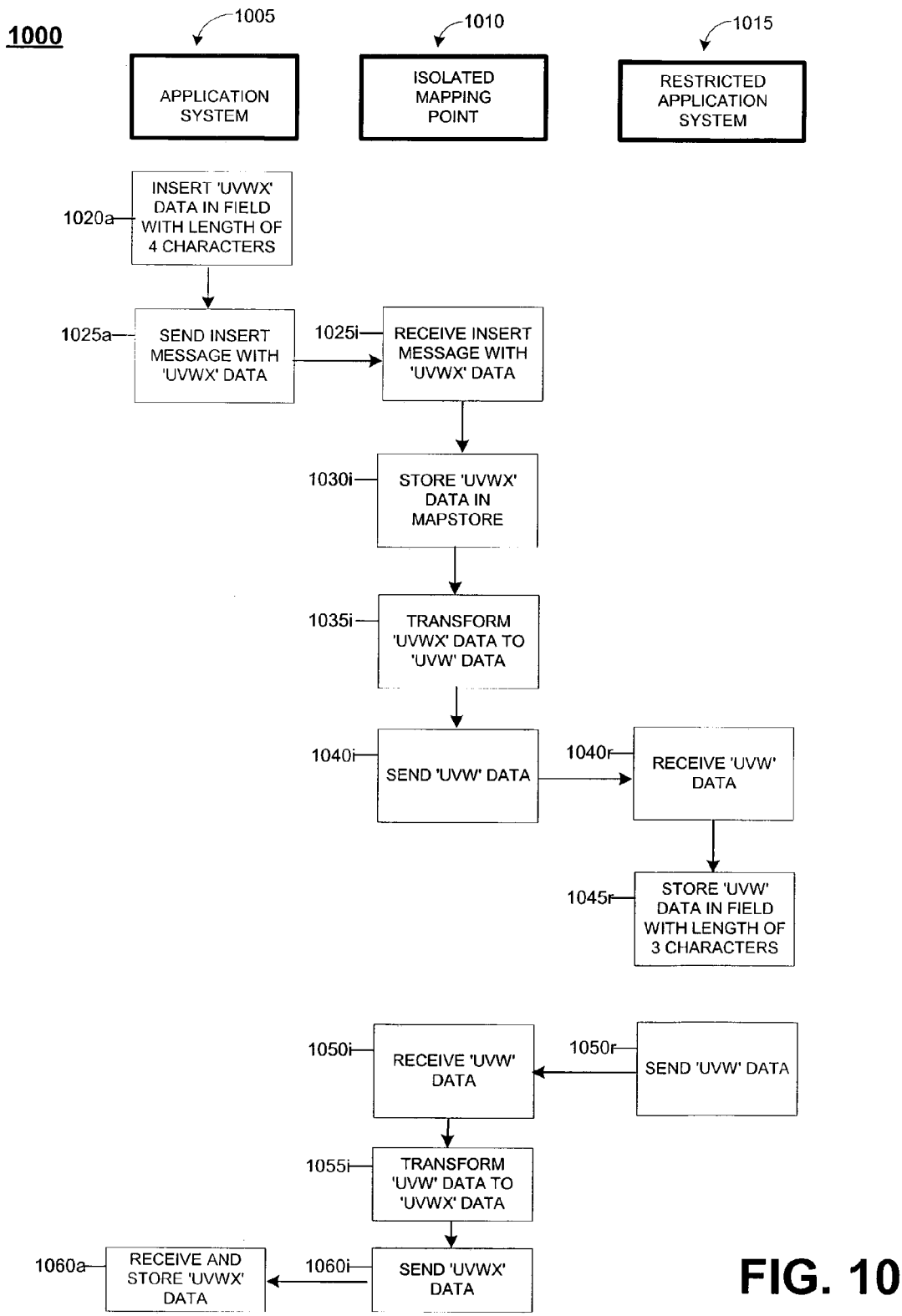
FIG. 10 is a diagram of a completion strategy process that permits an application system to exchange data with a more restrictive application system.

FIG. 10 illustrates a completion strategy process 1000 that permits an application system to exchange data with a more restrictive application system. In this example, the completion strategy process 1000 involves an application system 1005, an isolated mapping point 1010, and a restricted application system 1015. The process 1000 begins when the application system 1005 inserts a 'UVWX' data string into a field with a length of four characters (step 1020*a*). The application system 805 sends to the isolated mapping point 1010 an insert message with the 'UVWX' data (step 1025*a*).

The isolated mapping point 1010 receives this insert message (step 1025*i*) and stores the 'UVWX' data in a mapstore associated with the isolated mapping point 1010 (step 1030*i*). The isolated mapping point 1010 transforms the 'UVWX' data to a more restrictive 'UVW' data string to fit the field restrictions in the restricted application system 1015 (step 1035*i*). The isolated mapping point 1010 sends to the restricted application system 1015 the transformed, more restrictive 'UVW' data (step 1040*i*). The restricted application system 1015 receives the more restrictive 'UVW' data (step 1040*r*) and stores the 'UVW' data in a field with a length of three characters (step 1045*r*).

At some point, the restricted application system 1015 sends the 'UVW' data to the isolated mapping point (step 1050*r*). For example, the restricted application system 1015 may send the data because the restricted application system 1015 uses gross communication in which a whole record (not only the changed data) is provided to the application system 1005 in an update message. The restricted application system 1015 also may send the 'UVW' data when the isolated mapping point 1010 requests the data to correct a detected data inconsistency as may occur when the application system 1005 and the restricted application system 1015 use uneven authorizations, as described previously.

The isolated mapping point 1010 receives the 'UVW' data (step 1050*i*) and transforms the more restrictive 'UVW' data to the less restrictive 'UVWX' data (step 1055*i*). To accomplish the transformation, the isolated mapping point 1010 uses the 'UVWX' data previously stored in the mapstore. The isolated mapping point 1010 sends the less restrictive 'UVWX' data to the application system (step 1060*i*). The application system 1005 receives and stores the less restrictive 'UVWX' data (step 1060*a*).

This process in which an isolated mapping point stores original data received from a sending system and provides the original data to the sending system may be referred to as a completion strategy. A completion strategy is advantageous when one of the application systems is more restrictive than another application system. An application system may be more restrictive when an application system uses a smaller data field, as described previously. An application also may be more restrictive when an application system uses a more restrictive field segment structure.

An isolated mapping point may also use a completion strategy when performing cardinality mapping to transform a data segment from one application system to a data segment using different cardinality in another application system. In general, the isolated mapping point stores the data in the mapstore, stores the relationships associated with the data, and tracks that the data has been provided to the more restrictive application system. If the more restrictive application system later becomes able to store additional data, the isolated mapping point may then provide from the mapstore the data that was not provided to the more restrictive application system. For example, suppose a restrictive application system permits only one child record for each parent record in a particular relationship, and a less restrictive application system permits more than one (or "many" child records) for each parent record in the corresponding relationship. The isolated mapping point stores in the mapstore all of the child records that relate to the parent record in a mapstore even when only one child record is sent to the restrictive application system. The isolated mapping point indicates which child record has been sent, and which child record has not been sent, to the restrictive application system. When the child record sent to the restrictive application system is deleted and the restrictive application system has the ability to store another child record, the isolated mapping point sends another child record.

By using a completion strategy to store the data, the relationships between the data, and tracking what data and relationships have been provided to the more restrictive application system, the isolated mapping point may perform cardinality mapping between various types of cardinality. Examples of the cardinality mapping include mapping between one-to-one cardinality and one-to-many cardinality, mapping between one-to-one cardinality and many-to-one cardinality, mapping between one-to-one cardinality and many-to-many cardinality, mapping between many-to-one cardinality and one-to-many cardinality, and mapping between many-to-one cardinality and many-to-many cardinality.

Figure 11:
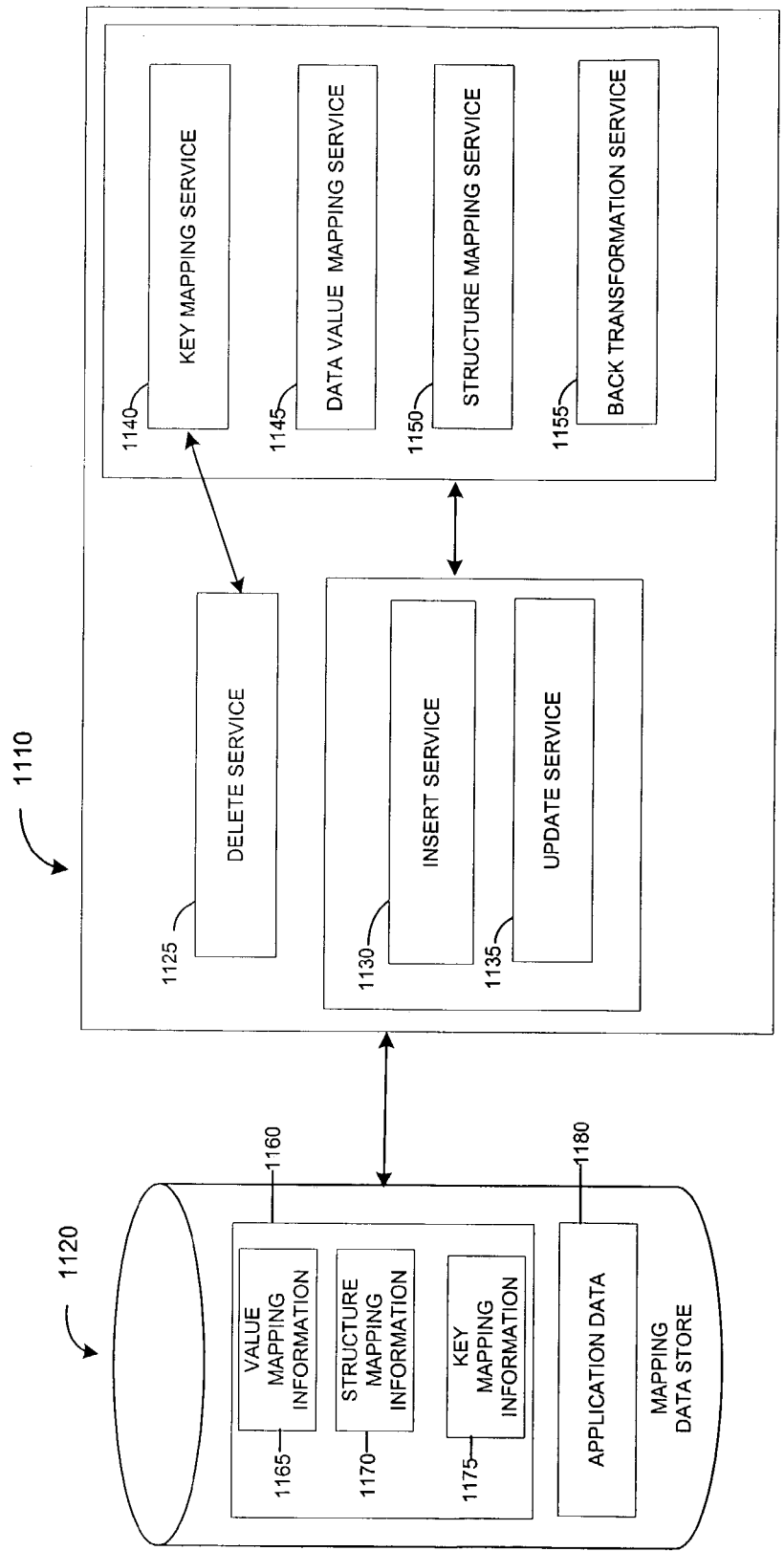
FIG. 11 is a diagram that depicts the components of a software architecture for an isolated mapping point.

FIG. 11 depicts the components of a software architecture for an isolated mapping point. This implementation may be used for the isolated mapping point 110 in FIG. 1, the isolated mapping point 210 in FIG. 2, the isolated mapping point 330 in FIG. 3, the isolated mapping point 410 in FIG. 4, the isolated mapping point 910 in FIG. 9, and the isolated mapping point 1010 in FIG. 10.

The software architecture 1100 includes processing components 1110 and a mapstore 1120 data component. The mapstore 1120 may constitute an implementation of data 158 in FIG. 1, the mapstore 225 in FIG. 2, the mapping database 360 in FIG. 3, and the mapstore 420 in FIG. 4. The processing components 1110 include a delete service 1125, an insert service 1130, an update service 1135, a key mapping service 1140, a data value mapping service 1145, a structure mapping service 1150, and a back transformation service 1155. The delete service 1125 may perform a process, such as process 600 in FIG. 6, to transform a delete data exchange message. The insert service 1130 may perform a process, such as process 500 in FIG. 5, to transform an insert data exchange message. The update service 1135 may perform a process, such as process 700 in FIG. 7, to transform an update data exchange message. The back transformation service 1155 may perform a back transformation process, such as the process 800 in FIG. 8 or the process 900 in FIG. 9.

The mapstore 1120 includes transformation data 1160 for transforming the data structure and values used by of one application system to the data structure and values used by another application system (or to the data structure and values used by a common document object). The transformation data 1160 also may be referred to as mapping data. Typically, the transformation data 1160 exists in a mapstore 1120 for each adapter that the isolated mapping point uses to exchange data with an application system. The transformation data 1160 includes value mapping information 1165, structure mapping information 1170, and key mapping information 1175. The transformation data 1160 is accessed by the processing components 1110 to perform the data transformation functions of the isolated mapping point.

The mapstore 1120 also includes application data 1180 for particular application data transformed by the isolated mapping point. The application data 1180 is stored by the isolated mapping point during the data transformation process, for example, as part of the completion strategy implemented by the isolated mapping point. The application data 1180 may be used to perform a back transformation process.

In particular, the delete service 1125 processes a delete message received by the isolated mapping point by accessing the key mapping service 1140 to provide a translation of the received key value to a key value that may be used by the receiving system. The key mapping service 1140 accesses key mapping information 1175 to perform the translation and provide the translated key to the delete service 1125.

The insert service 1130 and the update service 1135 both access the key mapping service 1140, the data value mapping service 1145, the structure mapping service, and the back transformation service 1155. As described previously, the key mapping service 1140 accesses key mapping information 1175 to translate the key. The key mapping service 1140 provides the translated key to the insert service 1130 or the update service 1135, as required. The data value mapping service 1145 accesses value mapping information 1165 to provide transformed data values to the insert service 1130 and the update service 1135, as required. The structure mapping service accesses the structure mapping information 1170 to provide transformed data structures to the insert service 1130 or the update service 1135, as required. The back transformation service 1155 accesses application data 1180 to provide a message with appropriate application data to the insert service 1130 or the update service 1135, as required.

Although the data transformation techniques described, including the techniques for a completion strategy and the techniques for a back transformation process, have been described as implemented by an isolated mapping point, other implementations are possible. For example, an application system involved in a data exchange with another application may use these data transformation techniques to perform application integration. Similarly, application integration software that is not associated with a particular application system and does not perform as an isolated mapping point also may use these data transformation techniques to perform application integration.

Implementations may include a method or process, an apparatus or system, or computer software on a computer medium. It will be understood that various modifications may be made. For example, advantageous results still could be achieved if steps of the disclosed techniques were performed in a different order and/or if components in the disclosed systems were combined in a different manner and/or replaced or supplemented by other components.

What is claimed is:

1. A computer-implemented method for exchanging computer data between a first data processing system having a less restrictive data structure and a second data processing system having a more restrictive data structure, the method comprising:

receiving, at a data exchange facility having a mapping data store and a mapping function, data values from the first data processing system, the data values being associated with a first data structure;

identifying a second data structure associated with the second data processing system and corresponding to the first data structure;

storing, on the data exchange facility, the data values received from the first data processing system for later transformation;

determining whether the second data structure associated with the second data processing system is capable of storing the data values received from the first data processing system;

transforming, at the data exchange facility, the received data values if the second data structure associated with the second data processing system is not capable of storing the received data values such that the second data structure is capable of storing the received data values; and only sending the data values received from the first data processing system to the second data processing system when the second data structure associated with the second data processing system is capable of storing the data values.

2. The method of claim 1 wherein receiving data values from the first data processing system comprises receiving from the first data processing system data values to be inserted in the second data processing system.

3. The method of claim 1 wherein receiving data values from the first data processing system comprises receiving from the first data processing system data values to update data stored in the second data processing system.

4. The method of claim 1 wherein:
the first data processing system comprises a groupware data system, and
the method further comprises receiving data from the groupware data system.

5. The method of claim 4 wherein receiving groupware data from the groupware data system comprises receiving contact information from the groupware data system.

6. The method of claim 4 wherein receiving groupware data from the groupware data system comprises receiving calendar information from the groupware data system.

7. The method of claim 1, wherein when the data values received from the first data processing system are not sent to the second data processing system, further comprising associating an indication that the data values received from the first data processing system have not been sent to the second data processing system with an identifier associated with the data values received.

8. The method of claim 7, wherein when the second data processing system is capable of storing the data values received from the first data processing system, further comprising sending the data values received from the first data processing system to the second data processing system.

9. The method of claim 1 further comprising:
determining whether the second data structure associated with the second data processing system is capable of storing a portion of the data values received from the first data processing system; and
only sending the portion of the data values received from the first data processing system to the second data processing system when the data structure associated with the second data processing system is capable of storing the portion of the data values.

10. The method of claim 9, wherein when the portion of the data values received from the first data processing system is not sent to the second data processing system, further comprising associating an indication that the portion of the data values received from the first data processing system has not been sent to the second data processing system with an identifier associated with the data values received.

11. The method of claim 10, wherein when the second data processing system is capable of storing the portion of the data values received from the first data processing system, further comprising sending the portion of the data values received from the first data processing system to the second data processing system.

12. A computer-implemented method for exchanging computer data between a first data processing system having a less restrictive data structure and a second data processing system having a more restrictive data structure, the method comprising:
receiving data values, having a first portion and a second portion, from the first data processing system, the data values being associated with a first data structure;
identifying a second data structure associated with the second data processing system and corresponding to the first data structure;
determining whether the second data structure associated with the second data processing system is capable of storing the first portion of the data values received from the first data processing system;
determining whether the second data structure associated with the second data processing system is capable of storing the second portion of the data values received from the first data processing system;
only sending the first portion of the data values received from the first data processing system to the second data processing system when the second data structure associated with the second data processing system is capable of storing the first portion of the data values; and
only sending the second portion of the data values received from the first data processing system to the second data processing system when the second data structure associated with the second data processing system is capable of storing the second portion of the data values;
storing an indication whether the first portion of the data values was sent to the second data processing system;
storing an indication whether the second portion of the data values was sent to the second data processing system;
when the first portion of the data values is not sent to the second data processing system, storing the first portion of the data values; and
when the second portion of the data values is not sent to the second data processing system, storing the second portion of the data values.

13. The method of claim 12, wherein when the first portion of the data values received from the first data processing system is not sent to the second data processing system, further comprising sending the first portion of the data values to the second data processing system when the second data processing system is capable of storing the first portion of the data values received.

14. A computer-readable medium having embodied thereon a computer program configured to exchange computer data between a first data processing system having a less restrictive data structure and a second data processing system having a more restrictive data structure, the medium or signal comprising one or more code segments configured to:
receive, at a data exchange facility having a mapping data store and a mapping function, data values from the first data processing system, the data values being associated with a first data structure;

identifying a second data structure associated with the second data processing system and corresponding to the first data structure;

store, on the data exchange facility, the data values received from the first data processing system for later transformation;

determine whether the second data structure associated with the second data processing system is capable of storing the data values received from the first data processing system;

transform, at the data exchange facility, the received data values if the second data structure associated with the second data processing system is not capable of storing the received data values such that the second data structure is capable of storing the received data values; and only send the data values received from the first data processing system to the second data processing system when the second data structure associated with the second data processing system is capable of storing the data values.

15. The medium of claim 14 wherein the one or more code segments are further configured to associate an indication that the data values received from the first data processing system has not been sent to the second data processing system with an identifier associated with the data values received when the data values received from the first data processing system is not sent to the second data processing system.

16. The medium of claim 15 wherein the one or more code segments are further configured to send the data received from the first data processing system to the second data processing system when the second data processing system is capable of storing the data values received from the first data processing system.

17. The medium of claim 14 wherein the one or more code segments are further configured to:
   determine whether the data structure associated with the second data processing system is capable of storing a portion of the data values received from the first data processing system; and
   only send the portion of the data values received from the first data processing system to the second data processing system when the data structure associated with the second data processing system is capable of storing the portion of data values.

18. The medium of claim 17 wherein the one or more code segments are further configured to associate an indication that the portion of the data received from the first data processing system has not been sent to the second data processing system with an identifier associated with the data values received when the portion of the data values received from the first data processing system is not sent to the second data processing system.

19. The medium of claim 18 wherein the one or more code segments are configured to send the portion of the data values received from the first data processing system to the second data processing system when the second data processing system is capable of storing the portion of the data values received from the first data processing system.

20. An apparatus for exchanging computer data between a first data processing system having a less restrictive data structure and a second data processing system having a more restrictive data structure, the apparatus comprising a processor connected to a storage device and one or more input/output devices, wherein the processor is configured to:
   receive, at a data exchange facility having a mapping data store and a mapping function, data values from the first data processing system, the data values being associated with a first data structure;
   identify a second data structure associated with the second data processing system and corresponding to the first data structure;
   store, on the data exchange facility, the data received from the first data processing system for later transformation;
   determine whether the second data structure associated with the second data processing system is capable of storing the data values received from the first data processing system;
   transform, at the data exchange facility, the received data values if the second data structure associated with the second data processing system is not capable of storing the received data values such that the second data structure is capable of storing the received data values; and
   only send the data values received from the first data processing system to the second data processing system when the second data structure associated with the second data processing system is capable of storing the data.

21. The apparatus of claim 20 wherein the processor is further configured to associate an indication that the data values received from the first data processing system has not been sent to the second data processing system with an identifier associated with the data values received when the data values received from the first data processing system are not sent to the second data processing system.

22. The apparatus of claim 21, wherein the processor is further configured to send the data values received from the first data processing system to the second data processing system when the second data processing system is capable of storing the data values received from the first data processing system.

23. The apparatus of claim 20 wherein the processor is further configured to:
   determine whether the data structure associated with the second data processing system is capable of storing a portion of the data values received from the first data processing system; and
   only send the portion of the data values received from the first data processing system to the second data processing system when the data structure associated with the second data processing system is capable of storing the portion of data values.

24. The apparatus of claim 23 wherein the processor is further configured to associate an indication that the portion of the data values received from the first data processing system has not been sent to the second data processing system with an identifier associated with the data values received when the portion of the data values received from the first data processing system is not sent to the second data processing system.

25. The apparatus of claim 24 wherein the processor is further configured to send the portion of the data values received from the first data processing system to the second data processing system when the second data processing system is capable of storing the portion of the data values received from the first data processing system.

* * * * *